US008827362B2

(12) United States Patent
Yamaki et al.

(10) Patent No.: US 8,827,362 B2
(45) Date of Patent: Sep. 9, 2014

(54) SEAT BACK FRAME FOR VEHICLE SEAT

(75) Inventors: Jogen Yamaki, Utsunomiya (JP);
Kenichi Saito, Utsunomiya (JP);
Takeshi Abe, Utsunomiya (JP);
Harutomi Nishide, Utsunomiya (JP);
Yozo Furuta, Utsunomiya (JP);
Yoshitomo Oka, Utsunomiya (JP);
Hisato Oku, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 267 days.

(21) Appl. No.: 13/379,547

(22) PCT Filed: Jun. 17, 2010

(86) PCT No.: PCT/JP2010/004056
§ 371 (c)(1),
(2), (4) Date: Dec. 20, 2011

(87) PCT Pub. No.: WO2011/001622
PCT Pub. Date: Jan. 6, 2011

(65) Prior Publication Data
US 2012/0098305 A1  Apr. 26, 2012

(30) Foreign Application Priority Data

Jun. 29, 2009 (JP) .................................. 2009-153754
Jun. 29, 2009 (JP) .................................. 2009-153755
Jun. 29, 2009 (JP) .................................. 2009-153756

(51) Int. Cl.
*B60N 2/42* (2006.01)
*B60N 2/68* (2006.01)
*B60N 2/66* (2006.01)

(52) U.S. Cl.
CPC *B60N 2/66* (2013.01); *B60N 2/682* (2013.01); *B60N 2/4235* (2013.01); *B60N 2/686* (2013.01); *B60N 2/4249* (2013.01); *B60N 2/68* (2013.01)

USPC .............. 297/216.13; 297/284.4; 297/452.31; 297/452.36

(58) Field of Classification Search
CPC .. B60N 2/4235; B60N 2/4249; B60N 2/4256; B60N 2/42709; B60N 2/66; B60N 2/686
USPC ............... 297/452.3, 452.31, 452.33, 452.34, 297/452.36, 216.13, 452.65, 284.4
See application file for complete search history.

(56) References Cited

U.S. PATENT DOCUMENTS 4,512,604 A    4/1985 Maeda et al.
7,320,503 B2 *  1/2008 Eysing ..................... 297/452.63
(Continued)

FOREIGN PATENT DOCUMENTS

GB       1438905         6/1976
JP       57-168434 U     10/1982
(Continued)

OTHER PUBLICATIONS

Russian Notice of Allowance and English Translation, Application No. 2012101658/11(002232), dated Jun. 27, 2013, 14 pages.

(Continued)

*Primary Examiner* — David E Allred
(74) *Attorney, Agent, or Firm* — Rankin, Hill & Clark LLP

(57) ABSTRACT

A seat back frame for the vehicle seat, includes a pair of side frames that are disposed on both sides in a seat width direction; and a supporting plate that has both ends connected to a bottom section of each of the side frames, wherein the supporting plate is at least disposed along an interval between a first height that corresponds to an upper part of a lumbar vertebra of an occupant seated in the seat and a second height that corresponds to a lower part of the lumbar vertebra, and curves in a manner such that, in a cross-section along with a vertical direction, the supporting plate bulges forward along a line from the first height to the second height.

5 Claims, 22 Drawing Sheets

(56) References Cited

U.S. PATENT DOCUMENTS

| | | | |
|---|---|---|---|
| 7,854,470 B2* | 12/2010 | Yamaki et al. | 296/187.12 |
| 8,033,602 B2* | 10/2011 | Yamaki et al. | 297/216.13 |
| 8,162,385 B2* | 4/2012 | Yamaki et al. | 296/187.12 |
| 2009/0021061 A1* | 1/2009 | Yamaki et al. | 297/216.13 |
| 2010/0207443 A1* | 8/2010 | Brncick | 297/452.48 |
| 2011/0298267 A1* | 12/2011 | Yamaki et al. | 297/391 |
| 2012/0013108 A1* | 1/2012 | Yamaki et al. | 280/730.2 |
| 2013/0140860 A1* | 6/2013 | Naughton et al. | 297/216.13 |

FOREIGN PATENT DOCUMENTS

| | | |
|---|---|---|
| JP | 60-155352 | 10/1985 |
| JP | 63-99555 | 6/1988 |
| JP | 05-301552 | 11/1993 |
| JP | 07-267038 | 10/1995 |
| JP | 09-136610 | 5/1997 |
| JP | 10-181400 | 7/1998 |
| JP | 11-105602 | 4/1999 |
| JP | 2006-248415 | 9/2006 |
| JP | 2009-046112 | 3/2009 |
| JP | 2009-190482 | 8/2009 |
| SU | 640877 | 1/1979 |

OTHER PUBLICATIONS

Japanese Office Action, application No. 2009-153755, dated Jun. 19, 2012, 4 pages.

Japanese Office Action, application No. 2009-153756, dated Jun. 19, 2012, 4 pages.

Japanese Office Action with English Translation dated Aug. 6, 2013, 5 pages.

* cited by examiner

US 8,827,362 B2

SEAT BACK FRAME FOR VEHICLE SEAT

TECHNICAL FIELD OF THE INVENTION

The present invention relates to a seat back frame for a vehicle seat that controls the behavior of the upper body of an occupant when receiving an impact from the rear part of a vehicle.

Priority is claimed on Japanese Patent Application No. 2009-153754 filed on Jun. 29, 2009, Japanese Patent Application No. 2009-153755 filed on Jun. 29, 2009, and Japanese Patent Application No. 2009-153756 filed on Jun. 29, 2009, the content of which is incorporated herein by reference.

BACKGROUND ART

For example, in Patent Document 1 shown below, there is disclosed a seat back frame for a vehicle seat in which a supporting plate is provided. The supporting plate rapidly reduces the clearance between the head of an occupant and the headrest when receiving an impact load from a vehicle rear part, so that the upper part of the pelvis of the occupant seated on the seat is supported from the back surface side.

In the case of the seat back frame, the front surface side of the supporting plate is formed flat, and the left and right end portions of the supporting plate are coupled to a side frame of a frame main body. Therefore, when receiving an impact from the rear of the vehicle, the waist of the occupant is first supported by the supporting plate. This allows the chest and head of the occupant to tilt backward at the waist (the upper pelvis). As a result, the head approaches the headrest quickly.

In addition, for example, in Patent Document 2 shown below, there is disclosed a seat back frame for a vehicle seat in which a back plate that is a plate-shaped reinforcement member is coupled to a rear part of the left and right side frames, so that when receiving an impact load from a vehicle side part, the load is transmitted from the side frame on the outer side in the vehicle width direction to the side frame on an inner side through the back plate.

In addition, for example, in Patent Document 3 shown below, there is disclosed a seat back frame for a vehicle seat in which a reinforcement pipe that is extended to the outer side in the vehicle width direction exceeding the width of a seat back is provided in a rear part of the left and right side frames, so that an impact load input from the side of the vehicle is transmitted to a central side of a vehicle body through the reinforcement pipe.

However, as for this seat back frame, the reinforcement pipe which has a large outer diameter is disposed in the rear part of the side frame, so that the front and rear widths of the seat back are increased to cause an increase in the size of the seat.

Meanwhile, for example, in Patent Document 2 shown below, there is disclosed a seat back frame in which a load transmission member protruded to the outer side in the vehicle width direction is provided to the side frame on the outer side in the vehicle width direction, so that back surfaces of the left and right side frames are coupled to each other by a reinforcement plate.

In the seat back frame, when the impact load is input from the side of the vehicle body, the load is transmitted from the load transmission member to the side frame on the outer side in the vehicle width direction. In addition, the load is transmitted from the side frame to another side frame on the inner side in the vehicle width direction through a rear side reinforcement plate.

PRIOR ART DOCUMENTS

Patent Documents

Patent Document 1: Japanese Unexamined Patent Application, First Publication No. H 10-181400
Patent Document 2: Japanese Unexamined Patent Application, First Publication No. 2009-46112
Patent Document 3: Japanese Unexamined Patent Application, First Publication No. H 7-267038

SUMMARY OF THE INVENTION

Problems to be Solved by the Invention

However, the above described conventional seat back frame, the waist of the occupant is supported from the rear part side by the flat surface of the supporting plate when receiving an impact from the rear of the vehicle. Therefore, an upper part (thoracic vertebrae) from the lumbar vertebrae of the occupant, which is desired to be supported, may be initially pushed by the upper part of the supporting plate. In this case, it is difficult for the chest and the head of the occupant to be moved to the rear side in a constant posture (the same phase).

In addition, as for the conventional seat back frame, the left and right side frames are connected by the back plate at an offset position to the rear side. Therefore, so that the back plate is effectively functioned for the purpose of load transfer, a complex and elaborate reinforced structure may be required.

In addition, as for the conventional seat back frame, the impact load input to the load transmission member is transmitted to the side frame on the outer side in the vehicle width direction, and then transmitted to the side frame on the inner side in the vehicle width direction through the reinforcement plate offset disposed to the rear side from the load transmission member. Therefore, since a moment in the bending direction is exerted on the side frame, the transmission efficiency of the load is reduced.

A first object of the invention is to provide a seat back frame for a vehicle seat in which the chest and the head of an occupant are moved to the rear side in a constant posture when receiving an impact from a vehicle rear part, thereby mitigating the impact on the occupant input from the seat.

A second object of the invention is to provide a seat back frame for a vehicle seat in which an impact load, which is input to a side frame from a vehicle side, is securely transmitted to another side frame without increasing structural complexity.

A third object of the invention is to provide a seat back frame for a vehicle seat in which the impact load input from the side of the vehicle is effectively transmitted to the side frame on an inner side in the vehicle width direction, thereby more rapidly transmitting the load.

Means for Solving the Problems (1) A seat back frame for a vehicle seat of the invention includes a pair of side frames that are disposed on both sides in the widthwise direction of the seat; and a supporting plate that has both ends connected to the bottom section of each of the side frames; wherein the supporting plate is at least disposed along an interval between a first height that corresponds to an upper part of the lumbar vertebrae of an occupant seated in the seat and a second height that corresponds to a lower part of the lumbar vertebrae, and curves in a manner such that, in a cross-section along with a vertical direction, the supporting plate bulges forward along a line from the first height to the second height.

Due to this, when the impact load is input from the rear of the vehicle, a specific area from the waist to the hip of an occupant seated on the seat is first pressed forward by a part in which the supporting plate bulges. Accordingly, the occupant is not pressed forward by an upper edge of the supporting plate, and the specific area from the waist to the hip of the occupant is always first pressed, so that the chest and the head of the occupant are moved to the rear side in a constant posture (the same phase). In addition, when receiving an impact from the rear of the vehicle, the specific area from the waist to the hip is first pressed forward, and the position of the head height of the occupant is lowered, so that the head of the occupant readily approaches the headrest.

In addition, at the time of receiving the impact load from the vehicle side part, when the load is input to the side frame on the outer side in the vehicle width direction, the load is transmitted to the side frame on the inner side in the vehicle width direction through the supporting plate for which the cross-section curves in a substantially vertical direction.

(2) In the seat back frame for the vehicle seat described in the above-mentioned (1), the supporting plate may be formed into a curved shape so that its center part becomes hollow in a cross-section along with the width direction.

Due to this, the shape of the supporting plate conforms to the curved shape of the waist or the hip of the occupant, so that a load pressing the occupant to the front side is dispersed in the seat width direction when receiving the impact from the rear of the vehicle. In addition, at the time of receiving the impact load from the vehicle side part, when the load is input to the side frame on the outer side in the vehicle width direction, the load is transmitted to the side frame of the other side through the supporting plate having a three-dimensional curved surface.

(3) In the seat back frame for the vehicle seat described in the above-mentioned (1), the supporting plate may be formed to be most bulged forward in the second height in the cross-section along with the vertical direction.

Due to this, when receiving the impact from the rear of the vehicle, a lower end part of the lumbar vertebrae of the occupant is first pressed forward by the supporting plate.

(4) In the seat back frame for the vehicle seat described in the above-mentioned (1), a back plate that is formed behind the supporting plate, and connects the back parts of each of the pair of side frames to each other may be further included.

(5) In the seat back frame for the vehicle seat described in the above-mentioned (4), the supporting plate may connect front parts of each of the side frames to each other.

Due to this, when an impact load is transmitted from the side of the vehicle to the side frame of one side, the load is transmitted to the side frame of the other side through the supporting plate and the back plate. In this instance, all areas of the front and rear widths of the left and right side frames function as a transmission block of the load together with the supporting plate and the back plate.

(6) In the seat back frame for the vehicle seat described in the above-mentioned (4), an upper joining part that connects an upper part of the supporting plate and an upper part of the back plate; and a lower joining part that connects a lower part of the supporting plate and a lower part of the back plate; may be further included.

Due to this, upper and lower parts of the supporting plate and upper and lower parts of the back plate are respectively joined to each other, so that a closed cross-section extended in the seat width direction is formed.

(7) In the seat back frame for the vehicle seat described in the above-mentioned (4), a load transmission member that is protruded from a side frame on the outer side in the vehicle width direction of the pair of the side frames to the outer side in the vehicle width direction may be further included.

(8) In the seat back frame for the vehicle seat described in the above-mentioned (7), the side frame on the outer side in the vehicle width direction may include a side wall that has a through hole to which a base part side of the load transmission member is inserted.

(9) In the seat back frame for the vehicle seat described in the above-mentioned (8), a rear wall extended on an inner side in the vehicle width direction from a rear end portion of the side wall may be mounted, and the base part of the load transmission member passing through the through hole of the side wall may be joined to a front surface of the rear wall while a side edge part on the outer side in the vehicle width direction of the back plate is joined to a rear surface of the rear wall.

Due to this, when receiving the impact load from the side of the vehicle to the load transmission member, the impact load is transmitted to the back plate through the joining part between the base part of the load transmission member and the rear wall of the side frame and the joining part between the rear wall of the side frame and the back plate.

(10) In the seat back frame for the vehicle seat described in the above-mentioned (9), a plurality of through holes of the side wall may be separately arranged in the vertical direction, and the load transmission member may include a plurality of pipe members that are inserted to each of the through holes and joined to a front surface of a rear wall of the side frame, and a block member that covers the plurality of pipe members and is disposed on the outer side in the vehicle width direction of the side wall.

Due to this, when receiving the impact load from the side of the vehicle to the block member of the load transmission member, the load is transmitted to the back plate through the joining part between the plurality of pipe members and the rear wall of the side frame.

Effect of the Invention

According to the seat back frame for the vehicle seat described in the above-mentioned (1), when receiving the impact load from the rear of the vehicle, a specific area from the waist to the hip of the occupant is first pressed forward by a part in which the supporting plate bulges. Therefore, the chest and the head of the occupant are moved to the rear side in a constant posture, thereby mitigating an impact to the head or neck of the occupant received from the headrest. In addition, the specific area from the waist to the hip of the occupant is first pressed forward, so that the position of the head height of the occupant is lowered. Therefore, the head of the occupant more rapidly approaches the headrest, thereby effectively protecting the neck of the occupant.

In addition, the cross-section in the substantially vertical direction of the supporting plate connecting lower edges of the left and right side frames is formed into a curved shape that bulges forward, thereby enhancing a load bearing performance in the seat width direction when receiving the impact from the side of the vehicle.

In the case of above-mentioned (2), the cross-sectional shape in the substantially horizontal direction of the supporting plate is curved shape in which the center side is recessed backward, so that the load exerted on the waist or the hip of the occupant is widely dispersed in the seat width direction when receiving the impact load from the rear of the vehicle.

Therefore, the impact exerted on the waist or the hip of the occupant may be mitigated. In addition, the load may be transmitted through the supporting plate having a three-dimensional curved surface when receiving the impact from the side of the vehicle, so that load bearing performance in the seat width direction at the time of a lateral collision may be further enhanced.

In the case of above-mentioned (3), when receiving the impact from the vehicle rear part, the lower end portion of the lumbar vertebrae of the occupant is first pressed forward by the supporting plate. Therefore, the upper portion of the lumbar vertebrae and the thoracic vertebra are retracted in the same phase, so that the chest and the head of the occupant may be more securely moved to the rear side in a constant posture.

In the cases of above-mentioned (4) and (5), front parts and back parts of the left and right side frames are respectively connected to each other by the supporting plate and the back plate. Therefore, by a simple structure, using all areas of the front and rear widths of both side frames, the supporting plate, and the back plate, the impact load input to the side frame of one side is securely transmitted to the side frame of the other side.

In addition, the back plate may be mounted from a rear side of the left and right side frames, and the supporting plate may be mounted from the front side of the left and right side frames, thereby facilitating an operation of joining the components by welding, and the like, and having superior productivity.

In the case of above-mentioned (6), the supporting plate and the back plate are joined to each other in the upper joining part and the lower joining part, and the left and right side frames are connected by a structure with a closed cross-section extended in the seat width direction due to the supporting plate and the back plate. Thus, the impact load inputting from the side of the vehicle to the side frame of one side may be transmitted to the side frame of one side while having a high strength.

In the cases of above-mentioned (7) to (9), the base part of the load transmission member is inserted to the through hole formed on a side wall of the side frame on the outer side in the vehicle width direction to be bonded to the front surface of the rear wall of the same side frame, a side edge on the outer side in the vehicle width direction of the back plate is bonded to the rear surface of the rear wall of the side frame on the outer side in the vehicle width direction. Therefore, the impact load inputting from the side of the vehicle is almost directly transmitted to the back plate from the load transmission member across the rear wall of the side frame, thereby further enhancing the transmission efficiency of the impact load.

In addition, since the base part of the load transmission member and the edge of the back plate are connected interposing the rear wall of the side frame, the thickness in the front and rear directions of the seat back is thinned, thereby reducing the size of the seat.

In the case of above-mentioned (10), the load inputting from the side of the vehicle is received using a block member having a large capacity, so that the load may be transmitted to the back plate through a plurality of pipe members. Therefore, with respect to the impact load having different input heights or angles, stable load transmission may be ensured.

DESCRIPTION OF EMBODIMENTS (1) First Embodiment

Hereinafter, a vehicle seat according to a first embodiment of the present invention will be described with reference to FIGS. 1 to 6. In addition, in drawings, an arrow F denotes the front side of the vehicle.

Figure 1:
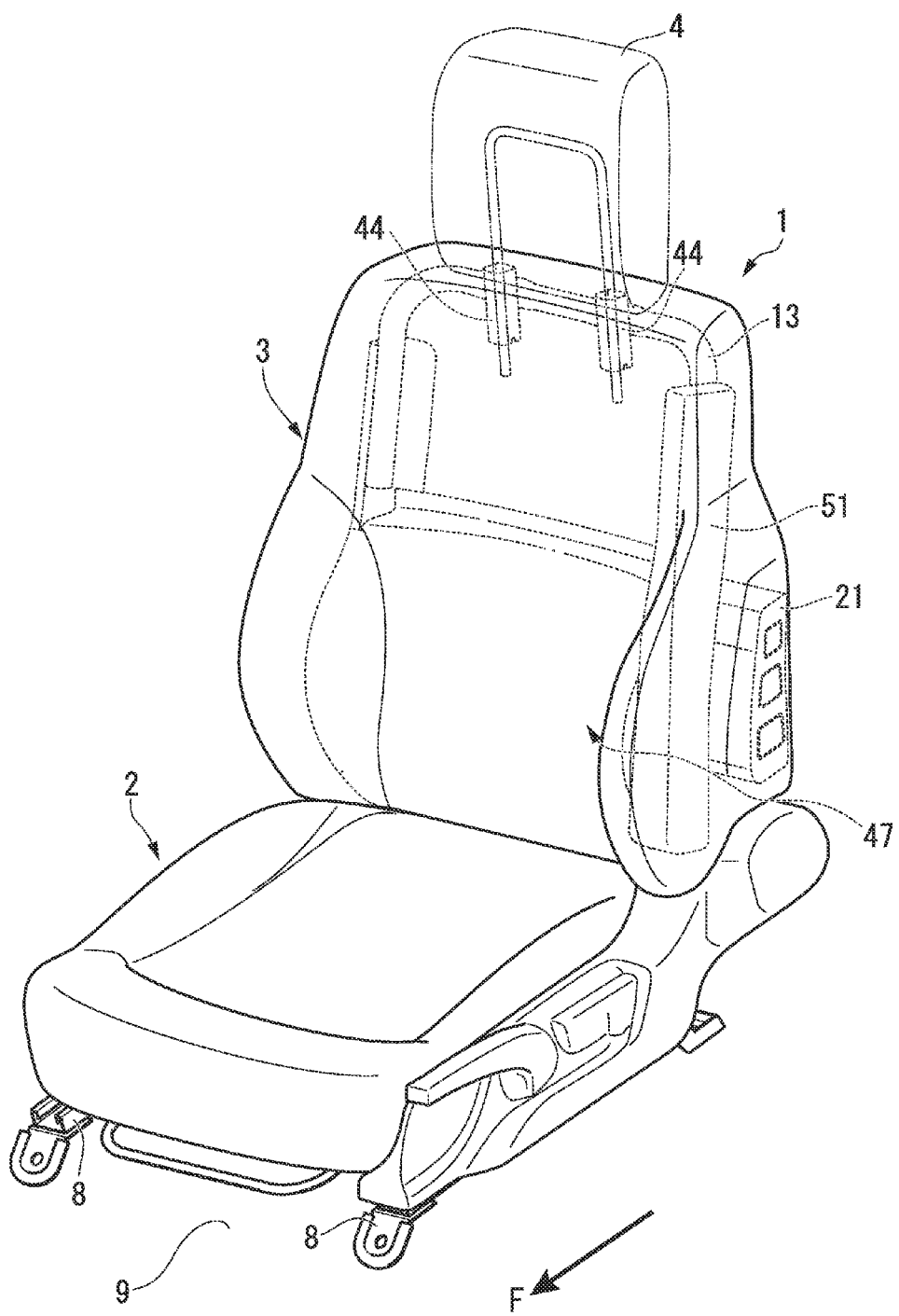
FIG. 1 is a perspective view seen obliquely upward from the front side of a vehicle seat according to a first embodiment of the present invention.
Figure 2:
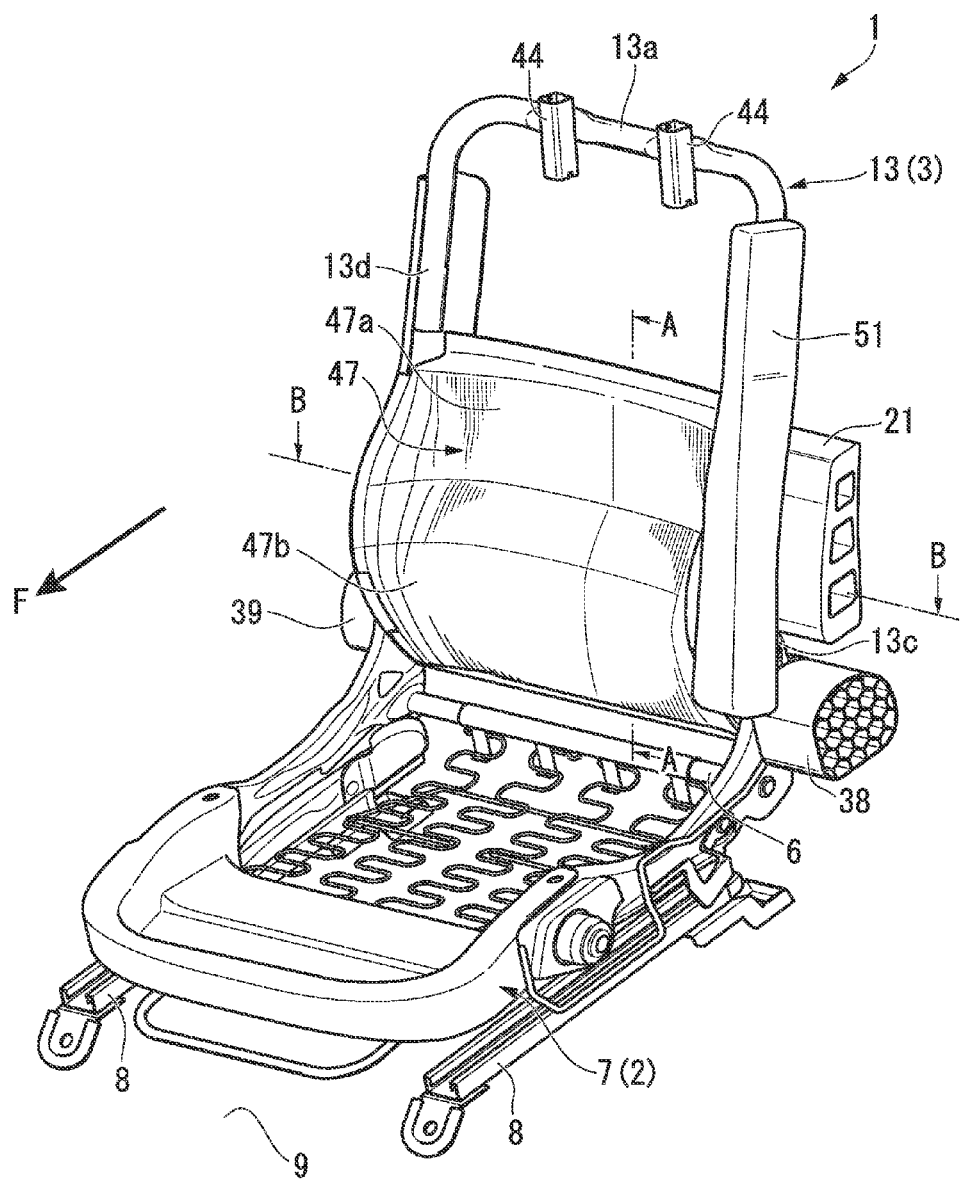
FIG. 2 is a perspective view seen obliquely upward from the front side a skeleton of a vehicle seat according to the first embodiment of the present invention.

FIG. 1 is a perspective view seen obliquely upward from the front side of a vehicle seat 1 provided in a front seat side of a vehicle, and FIG. 2 is a perspective view seen obliquely upward from the front side of a skeleton of the vehicle seat 1.

The vehicle seat 1 includes a seat cushion 2 that supports the buttocks of an occupant, a seat back 3 that is connected to a rear end part of the seat cushion 2 and mainly supports the waist or the chest (rear side) of an occupant, and a headrest 4 that is supported by an upper part of the seat back 3 and supports the head and the neck of the occupant.

As shown in FIG. 2, the seat cushion 2 includes a cushion frame 7 in which a rear cross member 6 extended in the vehicle width direction is attached to the rear end. The cushion frame 7 is attached to a vehicle body floor 9 through seat rails 8 and 8 so as to slide forward and backward.

Figure 3:
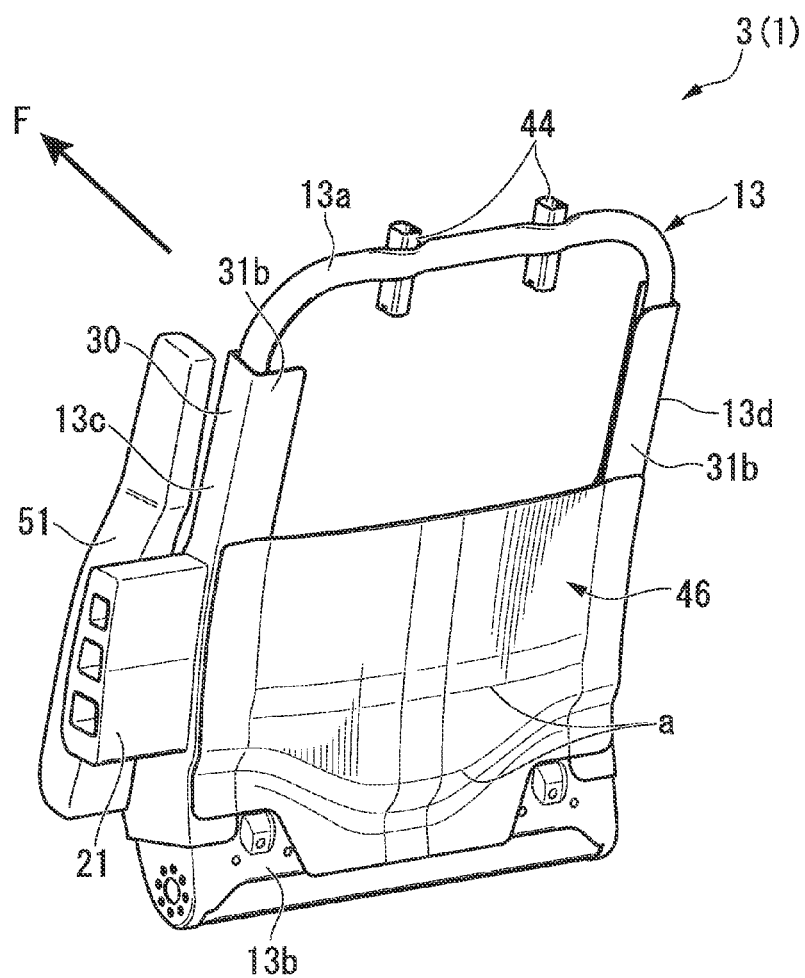
FIG. 3 is a perspective view seen obliquely upward from the rear side a seat back frame according to the first embodiment of the present invention.
Figure 4:
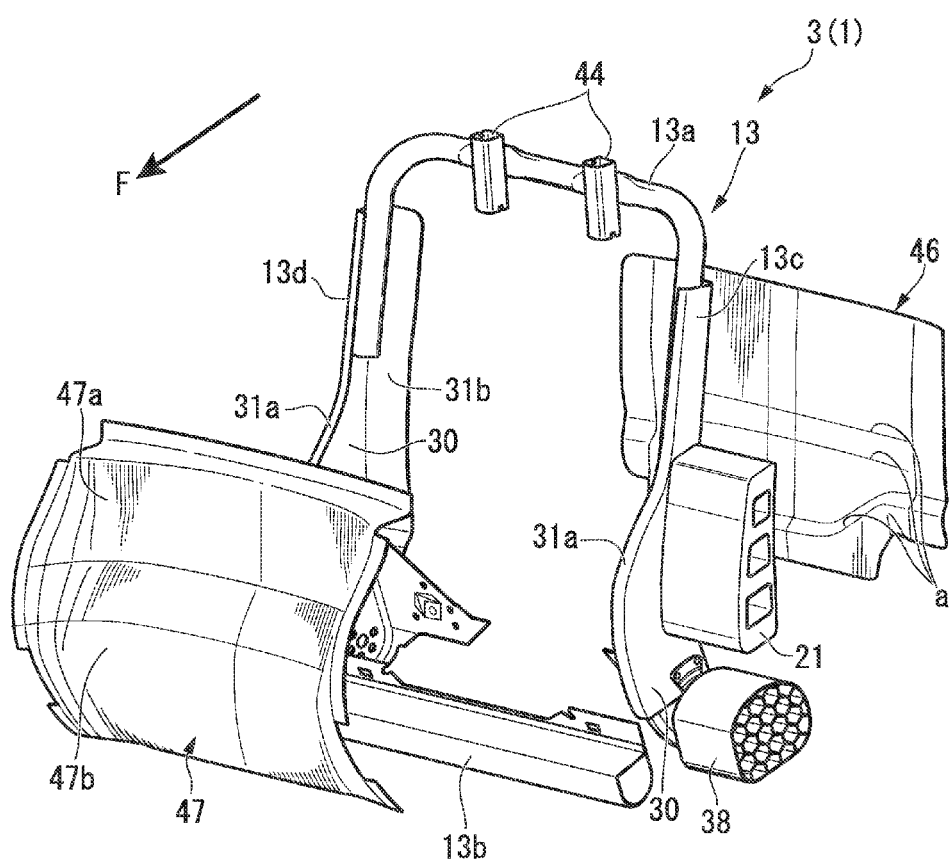
FIG. 4 is an exploded perspective view seen obliquely from upward from the front side a seat back frame according to the first embodiment of the present invention.
Figure 5:
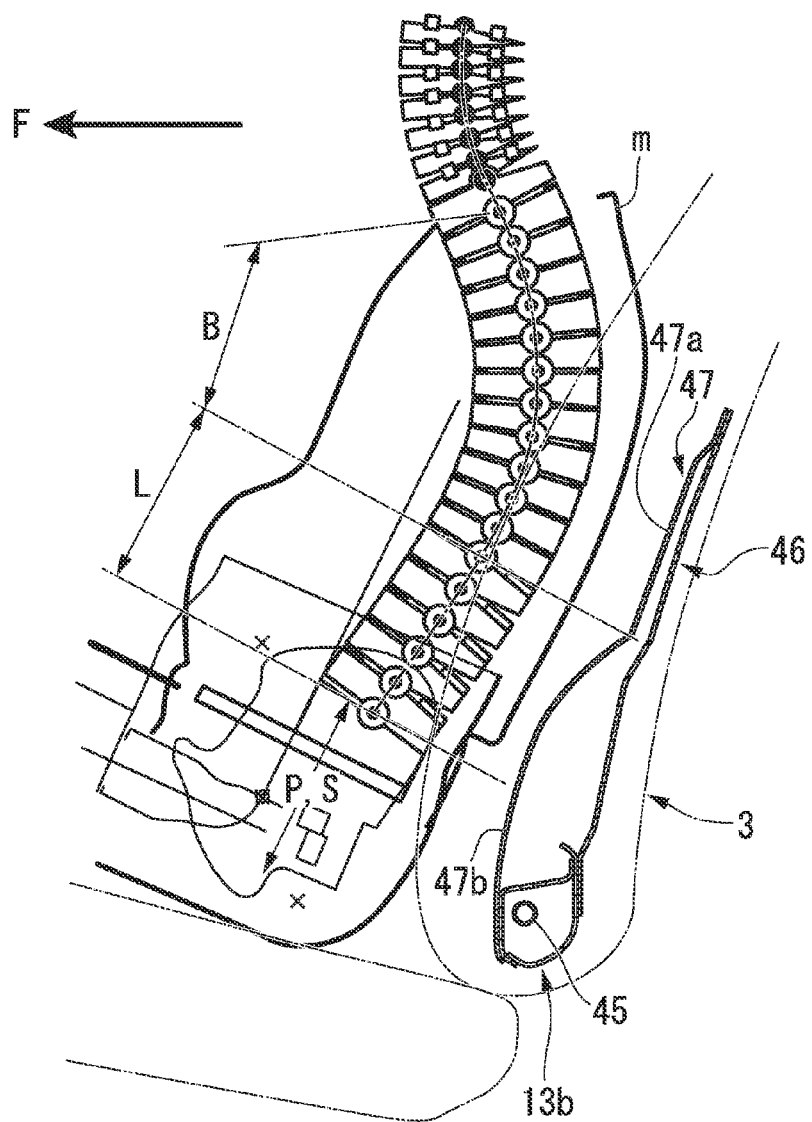
FIG. 5 is a cross-sectional view corresponding to an A-A line of a vehicle seat of FIG. 2 according to the first embodiment of the present invention.
Figure 6:
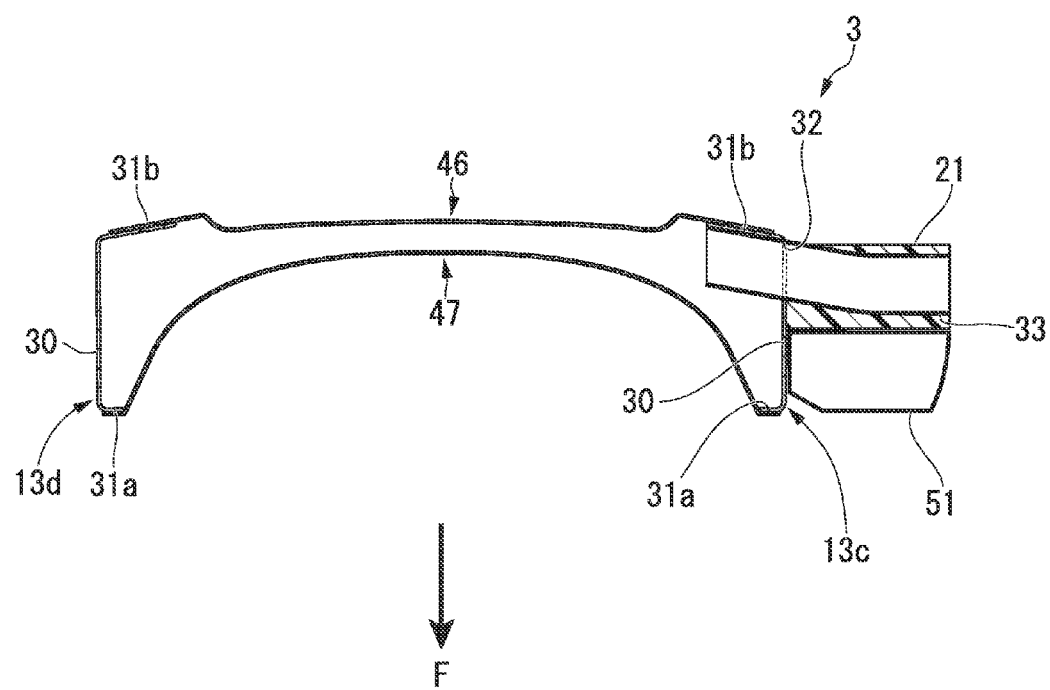
FIG. 6 is a cross-sectional view corresponding to a B-B line of a vehicle seat of FIG. 2 according to the first embodiment of the present invention.

FIG. 3 is a perspective view seen obliquely upward from the rear side a skeleton of the seat back 3, FIG. 4 is an exploded perspective view seen obliquely upward from the front side of the skeleton of the seat back frame 3, and FIGS. 5 and 6 are cross-sectional views of the skeleton of the seat back 3.

As shown in FIGS. 2 to 6, the seat back 3 includes a seat back frame 13 having a substantially rectangular frame shape, and the lower end of the seat back frame 13 is coupled with a rear end of the cushion frame 7 so as to incline. The seat back frame 13 includes an upper frame 13a, left and right side frames 13c and 13d, and a lower frame 13b.

The upper frame 13a is made of a substantially U-shaped pipe member. A pair of support pipes 44 (headrest support), which enable the headrest 4 to move up and down and support the headrest 4, are attached to the center of an upper side extended in the seat width direction of the upper frame 13a.

The left and right side frames 13c and 13d are made of a substantially U-shaped panel member in the horizontal direction. The side frames 13c and 13d are formed such that the front and rear widths of an upper region from a substantially center part in the vertical direction are narrower than the front and rear widths of a region below the substantially center part. The upper region of the side frames 13c and 13d having the narrower front and rear widths are welded and fixed on a corresponding side part of the upper frame 13a so as to enclose the upper region thereof from the outer side in the seat width direction at the U-shaped cross-section part. In addition, to the lower end sides of the side frames 13c and 13d, a hinge (not shown) that is connected to the rear end of the cushion frame 7 and a recliner mechanism (not shown) that adjusts a tilt angle of the seat back frame 13 are attached. In addition, as shown in FIG. 5, left and right recliner mechanisms are linked so as to interlock with each other by an operating rod 45 that is extended in the seat width direction.

The lower frame 13b is formed in a substantially cylindrical shape overall in such a manner that two pieces of curved plate members are bonded to each other, and extended in the seat width direction so as to surround the periphery of the operating rod 45. Both ends of the lower frame 13b are connected to lower ends of the left and right side frames 13c and 13d.

The left and right side frames 13c and 13d are respectively connected to a front wall 31a and a rear wall 31b that are curved to the inner side in the seat width direction in the front and rear of a side wall 30 facing the outer side in the seat width direction. As described above, the side wall 30 of the side frames 13c and 13d is formed such that the width of the upper part from the substantially center part is narrower, and the width of the lower part is wider. Specifically, the rear end side of the side wall 30 is formed approximately straight in the upper and lower regions. The front end side of the side wall 30 is formed approximately straight from the upper part to the middle region in the vertical direction. The front end side of the side wall 30 is curved so as to gently bulge forward from its center area toward the lower side. Accordingly, in a lower edge area of the front wall 31a of the side frames 13a and 13d, a curved surface that bulges forward to conform to the curved shape of the front end side of the side wall 30 is provided.

In the rear part between the side frames 13c and 13d, a corrugated-shaped back plate 46 in which a plurality of ridge line parts a runs in the seat width direction is disposed. A side edge part of both sides of the back plate 46 is welded and fixed on a rear surface of the rear wall 31b of the side frames 13c and 13d. The back plate 46 is disposed so as to surround a range from the lower end of the side frames 13c and 13d to an approximately middle height in the vertical direction. The lower end of the back plate 46 is welded and fixed on the rear surface of the lower frame 13b.

In addition, in the front side between the side frames 13c and 13d, a back pan 47 (supporting plate) made of the plate member that is curved in a three-dimensional manner is disposed. A side edge part of both sides of the back pan 47 is welded and fixed on the front surface of the front wall 31a of the side frames 13c and 13d. As shown in FIG. 5, a substantially center region in the vertical direction of the back pan 47 is curved toward the rear side so as to straddle between the left and right side frames 13c and 13d. An upper edge part 47a of the back pan 47 is extended upward by a predetermined length to be approximately parallel to the back pan 47, and then welded and fixed on an upper front surface of the back pan 47. In addition, the lower end of the back pan 47 is welded and fixed on the front surface of the lower frame 13.

As shown in FIG. 5, a part (hereinafter, referred to as "substantially the lower half part 47b") from the substantial center in the vertical direction of the back pan 47 to a lower region is formed into a curved cross-sectional shape in which the cross-section in the substantially vertical direction bulges forward toward the lower side. In FIG. 5, a skeleton from the chest to the hip of an occupant m is also described. The curved shape of the substantially the lower half part 47b of the back pan 47 bulges gently forward toward a lower end from an upper end of a lumbar vertebra L of the occupant. This curved shape is continuous until a bulging height of the lower end becomes a position of the pelvis P or the sacrum S of the occupant.

Therefore, when the impact load is input from the rear of the vehicle, a bulging part of the substantially the lower half part 47b of the back pan 47 first presses forward the lumbar vertebra L of the occupant m and the lower part of the lumbar vertebra L.

The upper edge part 47a of the back pan 47 is positioned to the rear side with respect to the substantially the lower half part 47b. Therefore, without pressing forward a thoracic vertebra B of the occupant m when receiving an impact from the rear of the vehicle, it is possible to bury the thoracic vertebra B to the rear side without bending forward the thoracic vertebra B. Further, the upper edge part 47a of the back pan 47 is a part enabling the thoracic vertebra B of the occupant m to be buried to the rear side when receiving the impact from the rear of the vehicle. Therefore, the upper edge part 47a of the back pan 47 may be abolished, or may be replaced with a structure that is easily deformed.

As shown in FIG. 6, the back pan 47 is formed such that the cross-section in the substantially horizontal direction is concave-curved, so that the center in the seat width direction is sunk to the rear side of the vehicle body. The concavely-curved cross-sectional shape is provided over the substantially all regions in the vertical direction of the back pan 47. In particular, in the upper region of the substantially the lower half part 47b, an indent depth of the curved cross-section is most deeply formed. Therefore, the waist of the occupant seated on the seat is supported by the curved shape in the substantially horizontal direction of the back pan 47 so that a region from the side to the back part is enclosed.

In addition, as shown in FIG. 5, the back pan 47 and the back plate 46 form a closed cross-section that is extended in the seat width direction between the side frames 13c and 13d of both sides together with the lower frame 13b, and function to transmit a load between the side frames 13c and 13d.

Meanwhile, a load transmission block 21 and a side air bag system 51 are attached to a surface on the outer side in the vehicle width direction of the side frame 13c.

The load transmission block 21 is a member that transmits an impact load from the side wall of the vehicle body to the side frame 13c at the time of a collision of a side surface of the vehicle, and the like. A plurality of cylindrical cross-sections that are extended in the vehicle width direction of the load transmission block 21 has honeycomb structures that are arranged in parallel. All of the load transmission blocks 21 are formed from a resin into a long rectangular shape in the vertical direction. As shown in FIG. 6, a through hole 32 is formed in the side wall 30 of the side frame 13c. A base part of a rectangular cylinder shaped guide pipe 33 is fitted into the through hole 32. In addition, a rear wall of the base part of the guide pipe 33 is welded and fixed on a front surface of the rear wall 31b of the side frame 13c. In this manner, the load transmission block 21 is fitted from the outer side of the side wall 30 into the guide pipe 33 attached to the side frame 13c.

The side air bag system 51 is obtained such that an inflator (not shown) for sensing an impact to generate gas and a bag body (not shown) for receiving and deploying a gas pressure of the inflator are modularized. The side air bag system 51 is attached adjacently to the front side of the load transmission block 21 on the side frame 13c.

In addition, as shown in FIG. 2, to the outer side (the outer side in the seat width direction) of the recliner mechanism (not shown) of the lower end of the side frames 13c and 13d of the left and right both sides, the load transmission blocks 38 and 39 are respectively attached. Each of the load transmission blocks 38 and 39 has a honeycomb structure in which a plurality of cylindrical cross-sections extended in the vehicle width direction are arranged in parallel, similar to the load transmission block 21 of the upper side. In addition, the load transmission block 39 attached to the side frame 13d on the inner side in the vehicle width direction is opposed to a side surface of a console box (not shown) at the center in the vehicle width direction.

In the above described configuration, when receiving an impact load from the rear of the vehicle, a front bulging part (a front bulging part of the cross-section in the substantially vertical direction) of the substantially the lower half part 47b of the back pan 47 first presses the lumbar vertebra L, the pelvis P, and the sacrum S of the occupant m seated in the seat from the rear surface side to the front side.

Therefore, as for the occupant m, the lower part side from the lumbar vertebra L is pressed forward. As a result, the upper part side from the thoracic vertebra L is pressed against the seat back 3. At the same time, the head and the neck are pressed against the headrest 4 because the position of the head height is made lower.

Meanwhile, when the impact load is input from the side of the vehicle, and a side wall of the vehicle body, such as a center pillar and the like, is transformed in the seat back 3 direction, the side wall abuts on the load transmission blocks 21 and 38 in the side of the vehicle seat 1, and loads of these are input. When the load is input to the lower load transmission block 38, the lower load transmission block 39 on the inner side in the vehicle width direction abuts on the console box while moving inward in the vehicle width direction of the entire seat. In this instance, the load is transmitted to a floor tunnel from the lower frame 13b of the seat back frame 13 through the load transmission block 39 and the console box.

In addition, when an impact load is input to the upper load transmission block 21, the load is transmitted, from the side, from the load transmission block 21 to the side frame 13c on the outer side in the width direction of the seat back frame 13. Further, the load is transmitted to the side frame 13d on the inner side in the width direction from the side frame 13c through a tubular structure by the back pan 47 and the back plate 46, and through the upper frame 13a and the lower frame 13b. The load transmitted to the side frame 13d is further transmitted to the floor tunnel through the load transmission block 39 and the console box.

Further, in the back plate 46 configuring the tubular structure together with the back pan 47 between the side frames 13c and 13d, a surface thereof is partitioned into a plurality of regions by the ridge line part a, that is extended in the seat width direction. Therefore, when the load is input to one end side in the seat width direction of the back plate 46, stress in a shear direction is generated in the plurality of partitioned regions. As a result, the input impact load is perceived over most regions of the back plate 46, and transmitted to the side frame 13d on the inner side so that the load is dispersed over the entire region of the back plate 46.

As described above, as for the seat back frame 13 of the vehicle seat 1, a bulging part in which the cross-section in the substantially vertical direction bulges forward is provided in the back pan 47 that supports the back part of the occupant m coupled with the side frames 13c and 13d. Therefore, when the impact is input from the rear of the vehicle, the bulging part first presses forward a lower part from the lumbar vertebra L of the occupant m. As a result, without warping forward the thoracic vertebra B of the occupant m, the chest, the head, and the neck of the occupant m are pressed against the seat back 3 and the headrest 4 in the same phase. In particular, in the case of the present embodiment, since a part corresponding to the lower end of the lumbar vertebrae of the occupant is most bulged forward, this makes it advantageous to move backward the chest, the head, and the neck of the occupant m in the same phase. Accordingly, it is possible to protect the neck of the occupant by enabling the head and the neck of the occupant to approach the headrest 4 early in the initial stage. At the same time, when the head and the neck are pressed against the headrest 4, the chest (the rear part) of the occupant m is pressed against the seat back 3 at about the same timing. Therefore, it is possible to mitigate the impact exerted on the head and the neck of the occupant m.

Further, in the seat back frame 13, a forward bulging part of the substantially the lower half part 47b of the back pan 47 presses forward the lumbar vertebra L of the occupant m and the lower side part thereof when the impact is received from the rear of the vehicle. Therefore, at the initial stage of the impact input, it is possible to enable the head of the occupant m to more rapidly approach the headrest 4 by lowering the position of the head height of the occupant m. Accordingly, it is possible to more advantageously protect the neck of the occupant m.

In addition, in the seat back frame 13, since the cross-section in the substantially vertical direction of the back pan 47 is a curved shape bulging forward, thereby enhancing the load bearing performance in the seat width direction when the impact load is input from the side of the vehicle.

Further, in the seat back frame 13, the cross-section in the substantially horizontal direction of the back pan 47 is a curved shape in which the center side is recessed backward in a concave shape. Therefore, when the impact is input from the rear of the vehicle, it is possible to disperse the load exerted on the waist and the hip of the occupant over a wide range in the seat width direction. As a result, it is possible to mitigate the load exerted on the waist and the hip of the occupant.

In addition, the back pan 47 is a curved shape in which the cross-section in the substantially vertical direction bulges forward, and also a curved shape in which the center side of the cross-section in the substantially horizontal direction is concave-recessed backward. Therefore, when the impact input from the side of the vehicle, it is possible to securely receive the load by a three-dimensional curved shape having a high load bearing performance of the back pan 47. Accordingly, even in a case in which the load is input from a slightly offset direction to the side frame 13c, the load may be rapidly transmitted to the side frame 13d of the other side through the back pan 47.

(2) Second Embodiment

Hereinafter, a vehicle seat according to the second embodiment of the present invention will be described with reference to FIGS. 7 to 13. Further, in the drawings, an arrow F indicates the front side of the vehicle.

Figure 7:
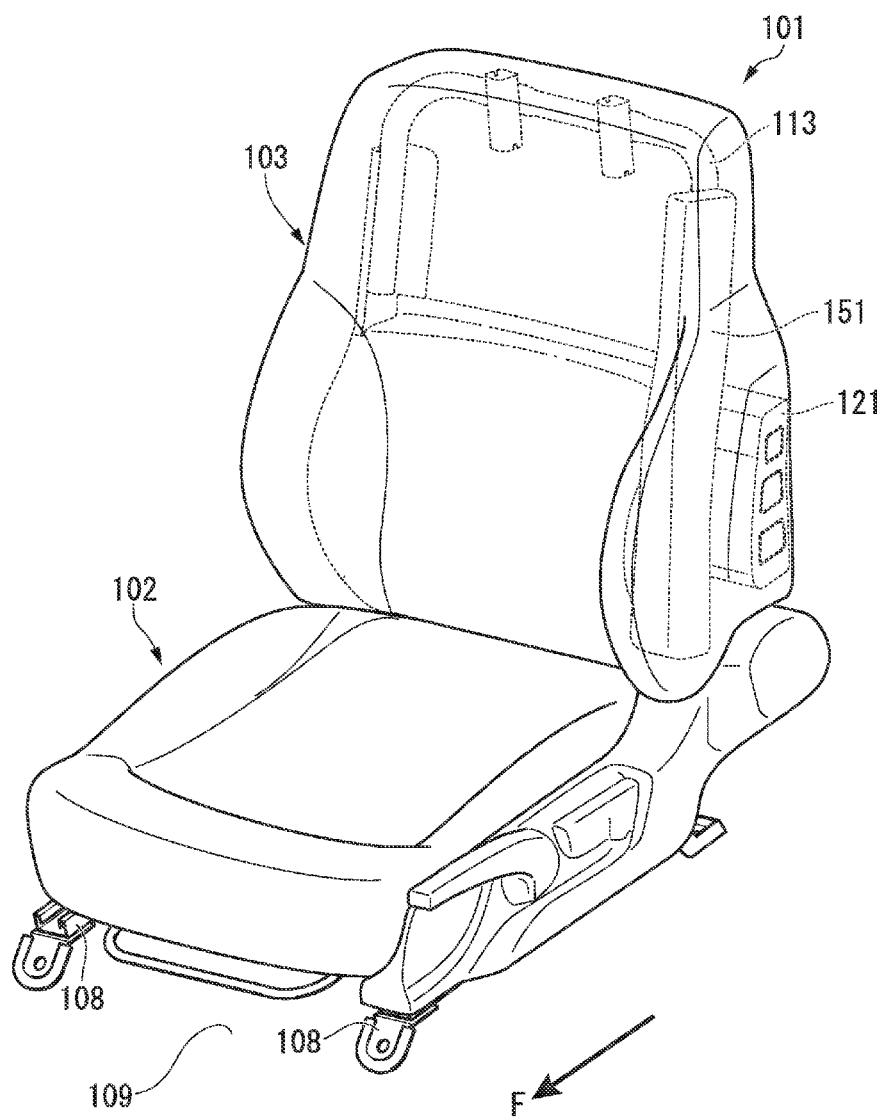
FIG. 7 is a perspective view seen obliquely upward from the front side of a vehicle seat according to a second embodiment of the present invention.
Figure 8:
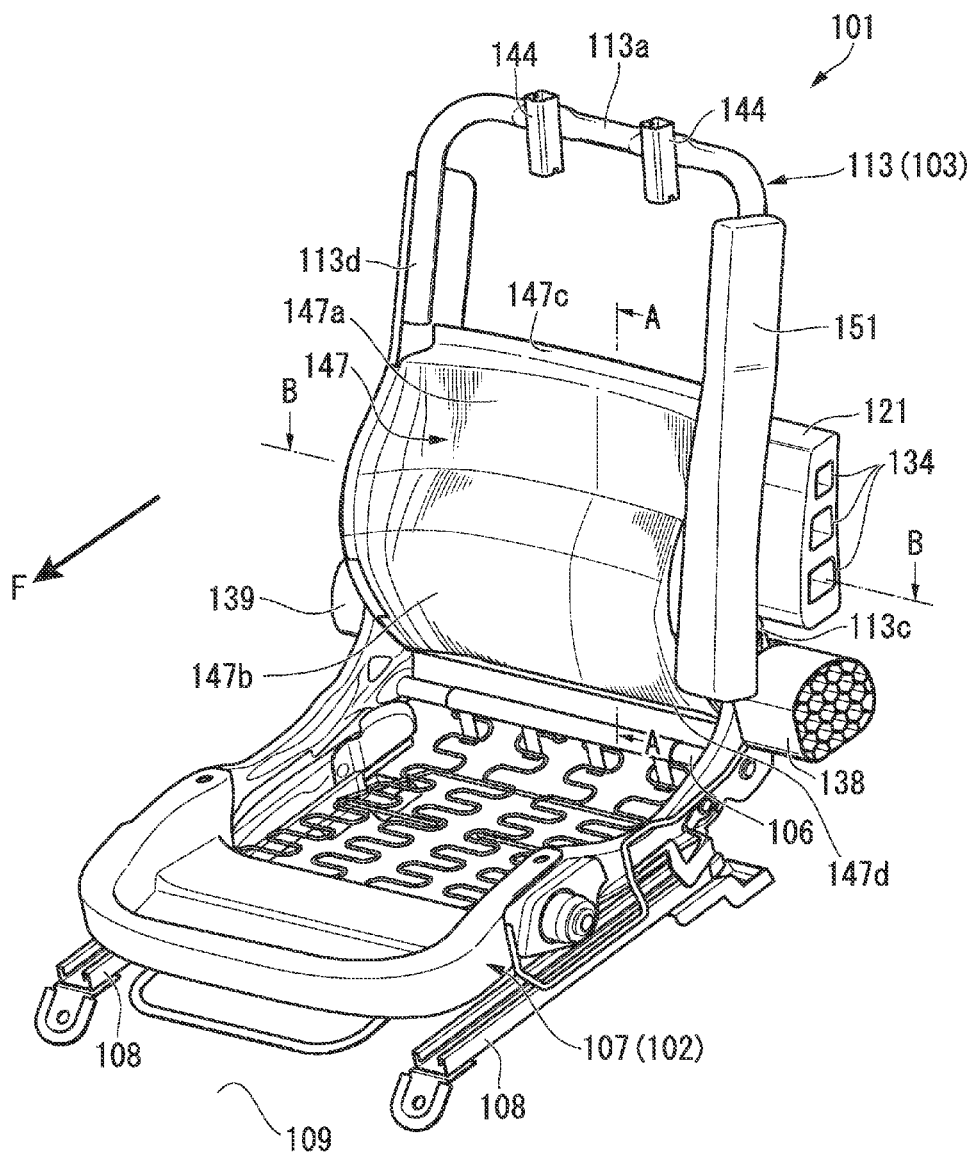
FIG. 8 is a perspective view seen obliquely upward from the front side a skeleton of a vehicle seat according to the second embodiment of the present invention.

FIG. 7 is a perspective view seen obliquely upward from the front side of a vehicle seat 101 mounted in the front seat side of the vehicle, and FIG. 8 is a perspective view seen obliquely upward from the front side a skeleton of the vehicle seat 101 in the similar manner.

The vehicle seat 101 includes a seat cushion 102 that supports the hip of the occupant, a seat back 103 that is connected to the rear end of the seat cushion 102 and mainly supports the waist and the chest (the back part) of the occupant, and a headrest (not shown) that is supported by the upper part of the seat back 103 and supports the head and the neck of the occupant.

As shown in FIG. 8, the seat cushion 102 includes a cushion frame 107 in which a rear cross member 106 extended in the vehicle width direction is attached to the rear end part. The cushion frame 107 is attached to a vehicle body floor 109 through seat rails 108 and 108 so as to slide forward and backward.

Figure 9:
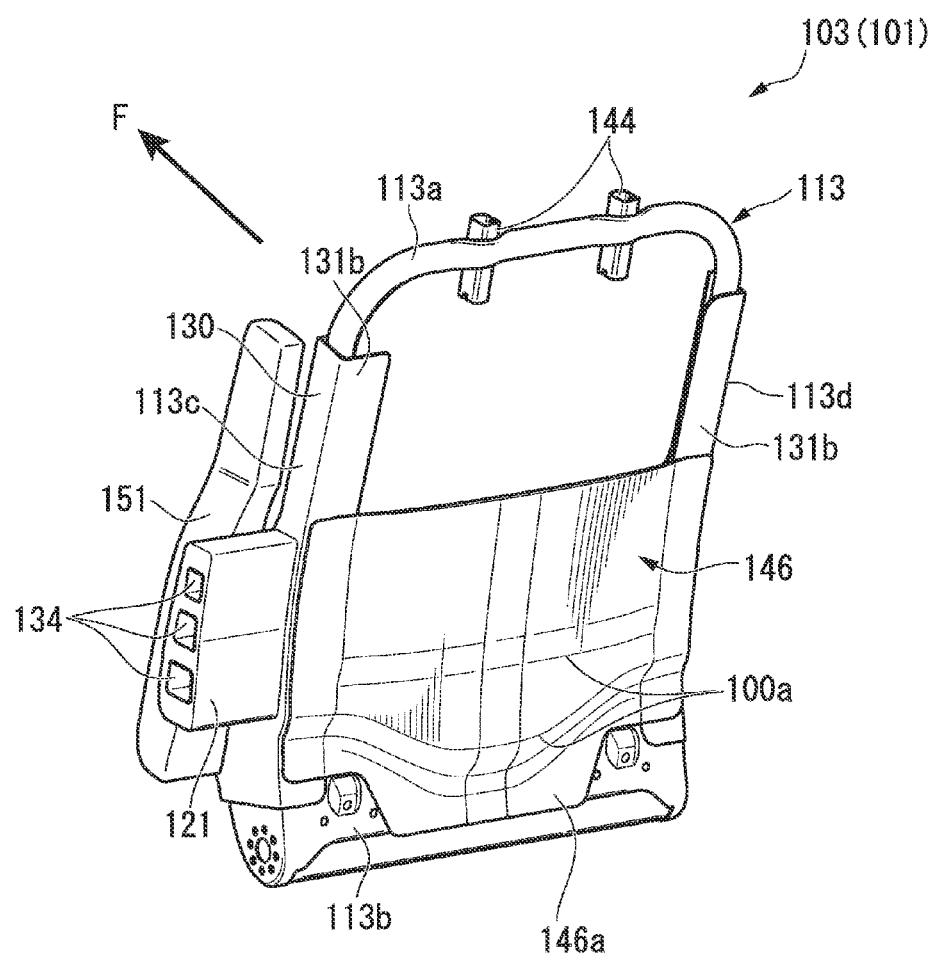
FIG. 9 is a perspective view seen obliquely upward from the rear side a seat back frame according to the second embodiment of the present invention.
Figure 10:
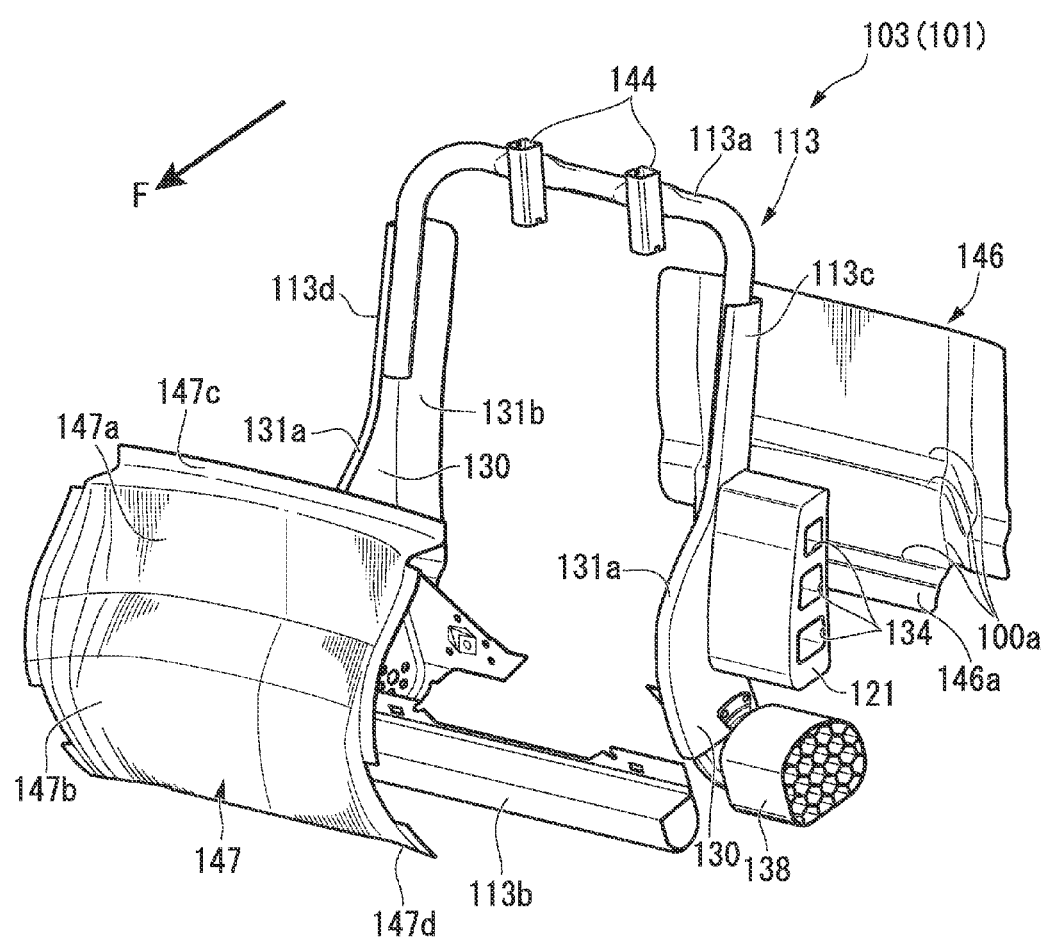
FIG. 10 is an exploded perspective view seen obliquely upward from the front side a seat back frame according to the second embodiment of the present invention.
Figure 11:
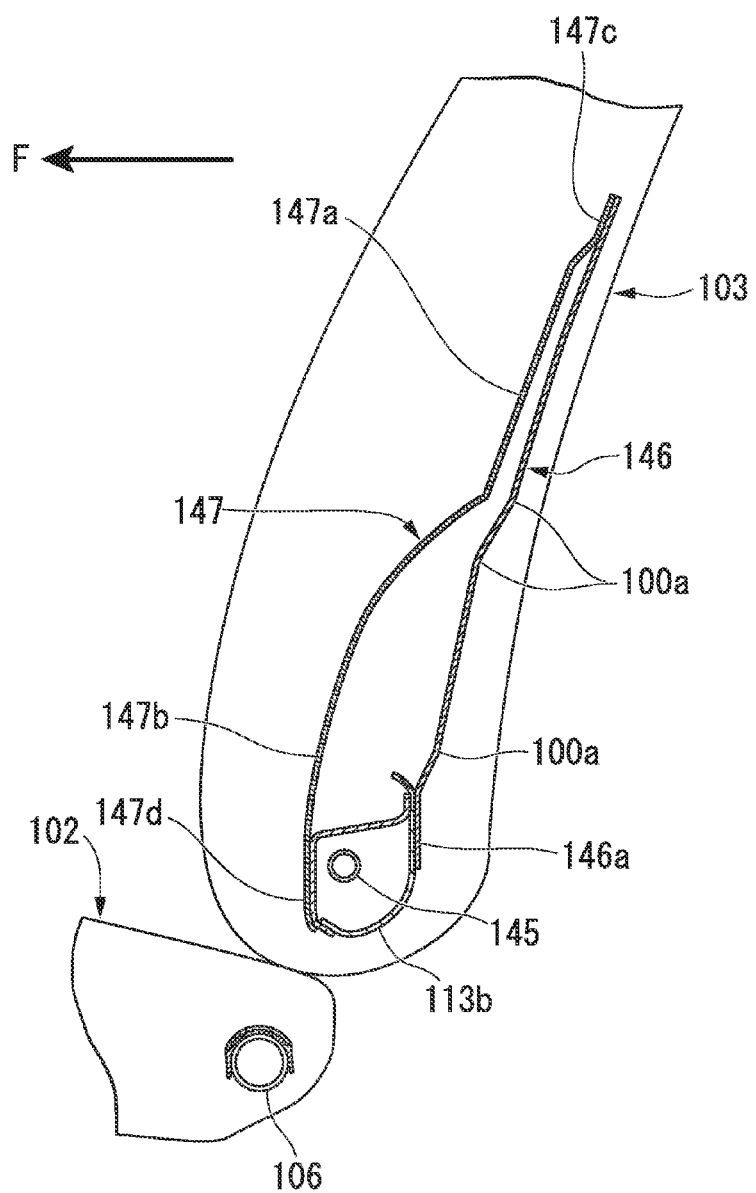
FIG. 11 is a cross-sectional view taken along an A-A line of FIG. 8.
Figure 12:
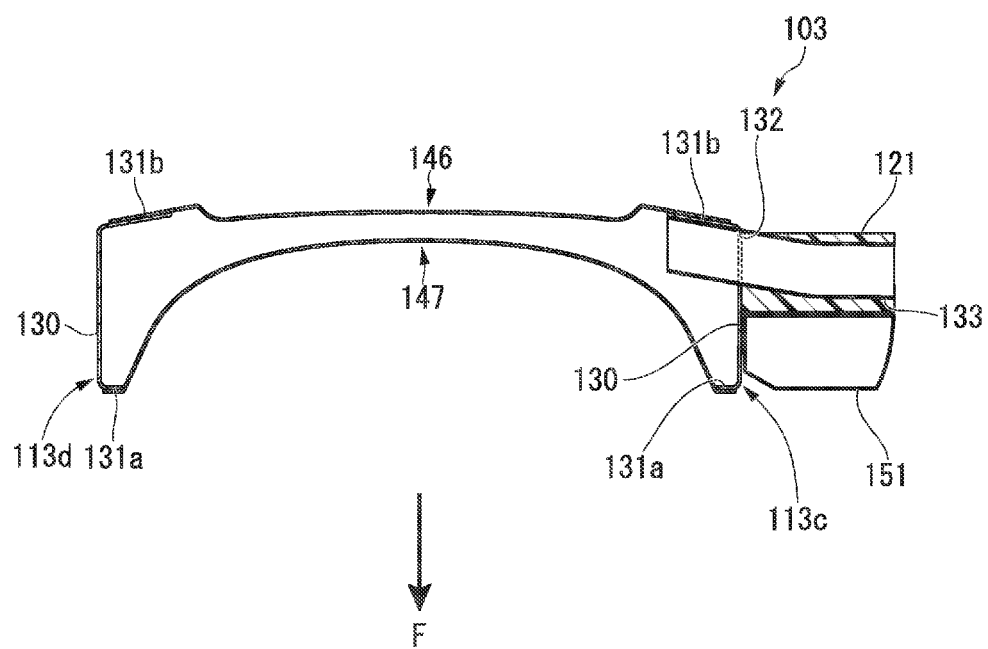
FIG. 12 is a cross-sectional view taken along a B-B line of FIG. 8.

FIG. 9 is a perspective view seen obliquely upward from the rear side the skeleton of the seat back 103, FIG. 10 is an exploded perspective view seen obliquely upward from the front side the skeleton, and FIGS. 11 and 12 are cross-sectional views of the skeleton of the seat back 103.

As shown in FIGS. 8 to 12, the seat back 103 includes a seat back frame 113 of a substantially rectangular frame shape, and the lower end of the seat back frame 113 is coupled to the rear end part of the cushion frame 107 so as to incline. The seat back frame 113 includes an upper frame 113a, left and right side frames 113c and 113d, and a lower frame 113b.

The upper frame 113a is made of a substantially U-shaped pipe member. To the center of the upper edge part extended in the seat width direction of the upper frame 113a, a pair of support pipes 144, which enable the headrest to move up and down and support the headrest, are attached.

The left and right side frames 113c and 113d are made of a pipe member the cross-section of which in the horizontal direction is a U-shape. The side frames 113c and 113d are formed such that the front and rear widths of an upper region from a substantially center part in the vertical direction are narrower than the front and rear widths of a region below the substantially center part. The upper region of the side frames 113c and 113d having the narrower front and rear widths are welded and fixed on a corresponding side part of the upper frame 113a so as to enclose the upper region thereof from the outer side in the seat width direction at the U-shaped cross-section part. In addition, to the lower end sides of the side frames 113c and 113d, a hinge (not shown) that is connected to the rear end of the cushion frame 107 and a recliner mechanism (not shown) that adjusts a tilt angle of the seat back frame 113 are attached. In addition, as shown in FIG. 11, left and right recliner mechanisms are linked so as to interlock with each other by an operating rod 145 that is extended in the seat width direction.

The lower frame 113b is formed in substantially in a cylindrical shape as a whole in such a manner that two pieces of curved plate members are bonded to each other, and extended in the seat width direction so as to surround the periphery of the operating rod 145. Both ends of the lower frame 113b are connected to lower ends of the left and right side frames 113c and 113d.

The left and right side frames 113c and 113d are respectively connected to a front wall 131a and a rear wall 131b that are curved to the inner side in the seat width direction in the front and rear of a side wall 130 facing the outer side in the seat width direction. As described above, the side wall 130 of the side frames 113c and 113d is formed such that the width of the upper part from the substantially center part is narrower, and the width of the lower part is wider. Specifically, the rear end side of the side wall 130 is formed approximately straight in the upper and lower regions. The front end side of the side wall 130 is formed approximately straight from the upper part to the middle region in the vertical direction. The front end side of the side wall 130 is curved so as to gently bulge forward from its center area toward the lower side. Accordingly, in a lower edge area of the front wall 131a of the side frames 113a and 113d, a curved surface that bulges forward to conform to the curved shape of the front end side of the side wall 130 is provided.

In the rear part between the side frames 113c and 113d, a corrugated-shaped back plate 146 (the rear plate) in which a plurality of ridge line parts 100a runs in the seat width direction is disposed. A side edge part of both sides of the back plate 146 is welded and fixed on a rear surface of the rear wall 131b of the side frames 113c and 113d. The back plate 146 is disposed so as to surround a range from the lower end of the side frames 113c and 113d to an approximately middle height in the vertical direction. In the lower end of the back plate 146, a lower joining piece 146a that is welded and fixed on the rear surface of the lower frame 113b is provided.

In addition, in the front side between the side frames 113c and 113d, a back pan 147 (front plate) made of the plate member that is curved in a three-dimensional manner is disposed. A side edge part of both sides of the back pan 147 is welded and fixed on the front surface of the front wall 131a of the side frames 113c and 113d. As shown in FIG. 11, a substantially center region in the vertical direction of the back pan 147 is curved toward the rear side so as to straddle between the left and right side frames 113c and 113d. An upper edge part 147a of the back pan 147 is extended upward by a predetermined length to be approximately parallel to the back pan 147, and then welded and fixed on an upper front surface of the back pan 147 by the upper joining piece 147c of the upper end. In addition, in the lower end of the back pan 147, a lower joining piece 147d that is welded and fixed on the front surface of the lower frame 113 is provided.

Further, in the present embodiment, the upper joining piece 147c of the back pan 147 and the upper front surface of the back plate 146 configure an upper joining part of the back pan 147 and the back plate 146. The lower joining piece 147d of the back pan 147 and the front surface of the lower frame 113b, and the lower joining piece 146a of the back plate 146 and the rear surface of the lower frame 113b configure a lower joining part of the back pan 147 and the back plate 146.

In the back pan 147 and the back plate 146, side edge parts of both sides are respectively welded and fixed on the front wall 131a and the rear wall 131b of the side frames 113c and 113d of both sides in a superimposing state. The upper edge parts are directly welded and fixed to each other. The lower edge parts are welded and fixed through the lower frame 113b. Accordingly, the back pan 147 and the back plate 146 configure a closed cross-section together with the lower frame 113b. The closed cross-section is extended in the seat width direction so as to connect between the side frames 113c and 113d.

As shown in FIG. 11, a part (hereinafter, referred to as the "substantially the lower half part 147b") from the substantial center in the vertical direction of the back pan 147 to a lower region is formed into a curved cross-sectional shape in which the cross-section in the substantially vertical direction bulges forward toward the lower side. The curved shape of the substantially the lower half part 147b of the back pan 147 bulges gently forward toward a lower end from an upper end of a lumbar vertebra of the occupant, and the bulging height is continuous up to almost the lower end.

As shown in FIG. 12, the back pan 147 is formed such that the cross-section in the substantially horizontal direction is concave-curved, so that the center in the seat width direction is sunk to the rear side of the vehicle body. The concavely curved cross-sectional shape is provided over substantially the entire region in the vertical direction of the back pan 147. In particular, in the upper region of the substantially the lower half part 147b, an indent depth of the curved cross-section is most deeply formed. Therefore, the waist and the hip of the occupant seated on the seat are supported by the curved shape in the substantially horizontal direction of the back pan 147 so that a region from the side part to the back part is enclosed.

Figure 13:
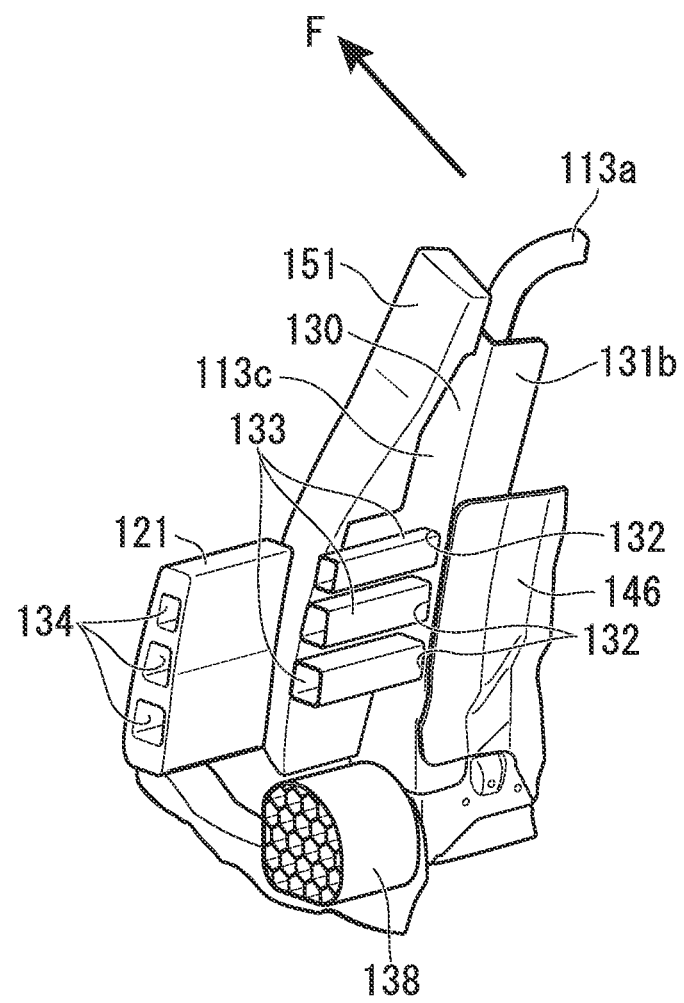
FIG. 13 is an exploded perspective view seen obliquely upward from the rear side a part of a seat back frame according to the second embodiment of the present invention.

FIG. 13 is an exploded perspective view showing an assembly state of components with respect to the side frame 113c which is the outer side in the vehicle width direction.

In the side wall 130 of the side frame 113c, three through holes 132 having a substantially rectangular shape are provided side by side in the vertical direction. A base part of a rectangular cylinder shaped guide pipes 133 are fitted into the through holes 132. The three through holes 132 are provided in a region, which is deviated to the rear side of the vehicle body with respect to the substantial center of the vertical direction of the side wall 130. The base part of each of the guide pipe 133 fitted into the through hole 132 is welded and fixed on the rear wall 131b that is extended in the inner side in the vehicle width direction from the rear end of the side wall 130 of the side frame 113. Specifically, as for the base part of the guide pipe 133, a flat rear wall is superimposed in the front surface of the rear wall 131b of the side frame 113c. In this state, both are welded and fixed. Also, the load transmission block 121 is fixed to three guide pipes 133 protruded outwardly in the vehicle width direction from the side wall 130 in a fitted state.

When an impact load is input from the side of the vehicle, the load transmission block 121 is a member that transmits the impact load from the side wall of the vehicle body to the side frame 113c. A plurality of cylindrical cross-sections that are extended in the vehicle width direction of the load transmission block 121 has honeycomb structures that are arranged in parallel. All of the load transmission blocks 121 are formed from resin into a long rectangular shape in the vertical direction. In addition, the load transmission block 121 includes a plurality of fitting holes 134 into which the guide pipes 133 protruded to the side frame 113c are fitted. In a state in which these fitting holes 134 are fitted into the guide pipes 133, upper and lower end parts of a root part side of the load transmission block 121 are fastened and fixed to the side frame 113c by a bolt.

In addition, a side air bag system 151 for protecting an occupant is attached to the side wall 130 of the side frame 113c.

The side air bag system 151 is obtained such that an inflator (not shown) for sensing an impact to generate gas and a bag body (not shown) for receiving and deploying a gas pressure of the inflator are modularized. The side air bag system 151 is attached adjacently to the front side of the load transmission block 121 on the side frame 113c.

In addition, as shown in FIG. 8, to the outer side (the outer side in the seat width direction) of the recliner mechanism (not shown) of the lower end of the side frames 113c and 113d of the left and right both sides, the load transmission blocks 138 and 139 are respectively attached. Each of the load transmission blocks 138 and 139 have a honeycomb structure in which a plurality of cylindrical cross-sections extended in the vehicle width direction are arranged in parallel, similar to the load transmission block 121 of the upper side. In addition, the load transmission block 139 attached to the side frame 113d on the inner side in the vehicle width direction is opposed to a side surface of a console box (not shown) at the center in the vehicle width direction.

In the above described configuration, when receiving an impact load from the side of the vehicle, and a side wall of the vehicle body, such as a center pillar and the like, is transformed in the seat back 103 direction, the side wall abuts on the load transmission blocks 121 and 138 in the side part of the vehicle seat 101, and loads of these are input. When the load is input to the lower load transmission block 138, the lower load transmission block 139 on the inner side in the vehicle width direction abuts on the console box while moving inward in the vehicle width direction of the entire seat. In this instance, the load is transmitted to a floor tunnel from the lower frame 113b of the seat back frame 113 through the load transmission block 139 and the console box.

In addition, when an impact load is input to the upper load transmission block 121, the load is transmitted, from the side, from the load transmission block 121 to the side frame 113c on the outer side in the width direction of the seat back frame 113. Further, the load is transmitted to the side frame 113d on the inner side in the width direction from the side frame 113c through a tubular structure by the back pan 147 and the back plate 146, and through the upper frame 113a and the lower frame 113b. The load transmitted to the side frame 113d is further transmitted to the floor tunnel through the load transmission block 139 and the console box.

Further, in the back plate 146 configuring the tubular structure together with the back pan 147 between the side frames 113c and 113d, a surface thereof is partitioned into a plurality of regions by the ridge line part 100a that is extended in the seat width direction. Therefore, when the load is input to one end side in the seat width direction of the back plate 146, stress in a shear direction is generated in the plurality of partitioned regions. As a result, the input impact load is perceived over most regions of the back plate 146, and transmitted to the side frame 113d on the inner side so that the load is dispersed over the entire region of the back plate 146.

In addition, when the impact load is input from the rear of the vehicle, a front bulging part (a front bulging part of the cross-section in the substantially vertical direction) of the substantially the lower half part 147*b* of the back pan 147 first presses a part (a lower part from the lower end of the lumbar vertebrae) from the waist to the hip of the occupant seated on the seat from the rear surface side to the front side. Therefore, the lower side of the waist of the occupant is pressed forward. Accordingly, the chest, the head, and the neck of the occupant are pressed against the seat back 103 and the headrest. As a result, the head and the neck of the occupant approach the headrest at an early point in the initial state, and the neck of the occupant is protected.

As described above, in the seat back frame 113 of the vehicle seat 101, front parts and rear parts of the left and right side frames 113*c* and 113*d* are respectively coupled to each other by the back pan 147 and the back plate 146. Therefore, by a rigid structure using all regions in the width direction of the side frames 113*c* and 113*d* of both sides, the back pan 147 and the back plate 146, the impact load input to the side frame 113*c* on the outer side in the vehicle width direction is securely transmitted to the side frame 113*d* on the inner side.

In particular, in the seat back frame 113 of the present embodiment, an upper end part and a lower end part of the back pan 147 and the back plate 146 are mutually coupled to each other. Both edge parts of these the back pan 147 and the back plate 146 are coupled to the front wall 131*a* and the rear wall 131*b* of the side frames 113*c* and 113*d*. Therefore, the back pan 147 and the back plate 146 has a cylindrical-shaped structure in which it extends in the seat width direction together with the lower frame 113*b*, and it is possible to transmit the impact load between the side frames 113*c* and 113*d*.

In addition, in the seat back frame 113, both edge parts of the back pan 147 are superimposed on the front wall 131*a* of the side frames 113*c* and 113*d* to be welded and fixed from the front part side. Similarly, both edge parts of the back plate 146 are superimposed on the rear wall 131*b* of the side frames 113*c* and 113*d* to be welded and fixed backward. Therefore, there is an advantage in that the welding operation of the back pan 147 and the back plate 146 is easy. In the case of the seat back frame 113, it is possible to perform the vertical welding operation of the back pan 147 and the back plate 146 in front and rear directions, and for the welding operation of each of the components to effectively proceed.

Further, in the seat back frame 113, the back pan 147 is formed so as to be curved backward toward the center from the both ends in the seat width direction. Therefore, it is possible to suitably maintaining a seating feeling of the occupant during normal use. Further, when the impact is input from the rear of the vehicle, it is possible to mitigate an impact exerted on the occupant by widely dispersing the load in the seat width direction.

In addition, in the case of the seat back frame 113, the back pan 147 configuring the cylindrical shaped structure together with the back plate 146 is formed in a three-dimensional curved shape in which the cross-section in the substantially vertical direction bulges forward and the cross-section in the substantially horizontal direction is concave-recessed toward the center side. Therefore, it is possible to obtain a high load bearing performance with respect to the impact load input from the side of the vehicle. Even in the case in which the load is input from a slightly offset direction to the side frame 113*c*, the load may be rapidly transmitted to the side frame 113*d* of the other side through the back pan 147.

(3) Third Embodiment

Hereinafter, a vehicle seat according to a third embodiment of the present invention will be described with reference to FIGS. 14 to 22. Further, in the drawings, an arrow F indicates a front side of the vehicle.

Figure 14:
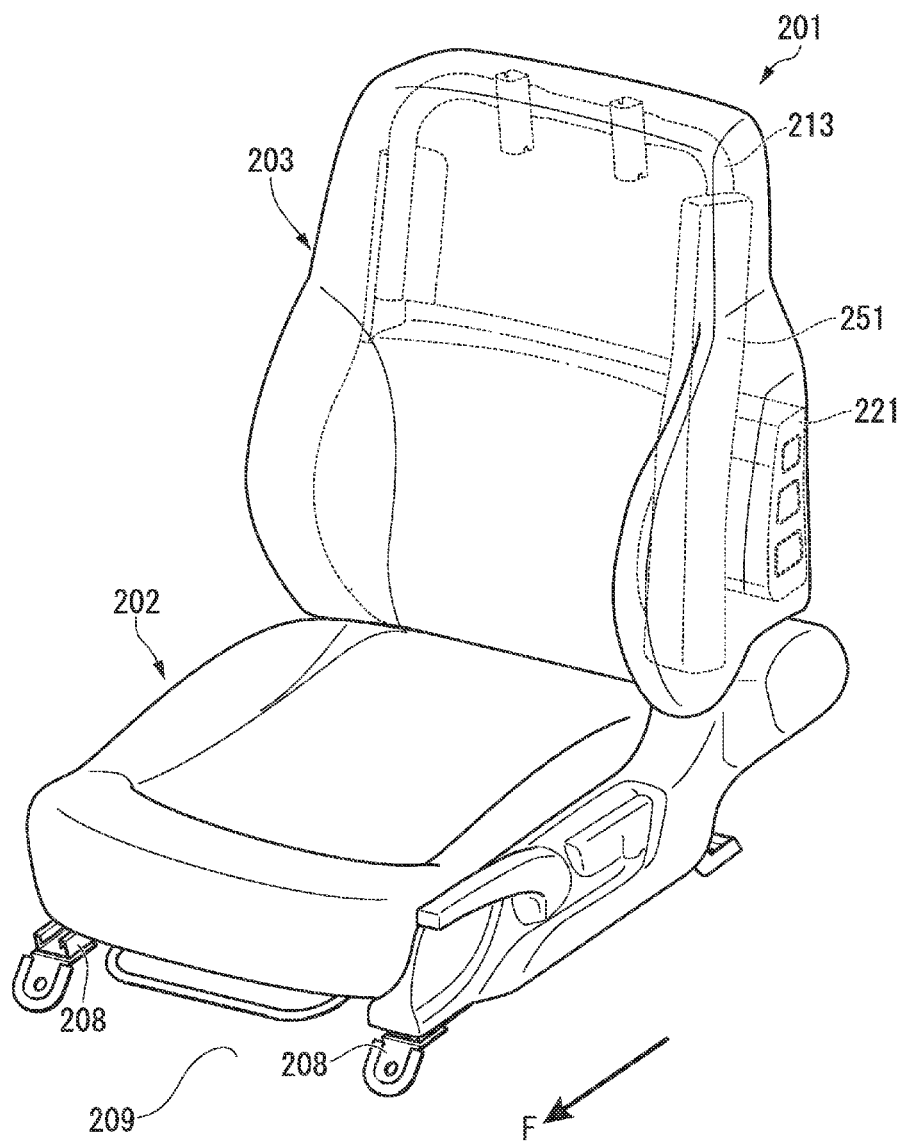
FIG. 14 is a perspective view seen obliquely upward from the front side of a vehicle seat according to a third embodiment of the present invention.
Figure 15:
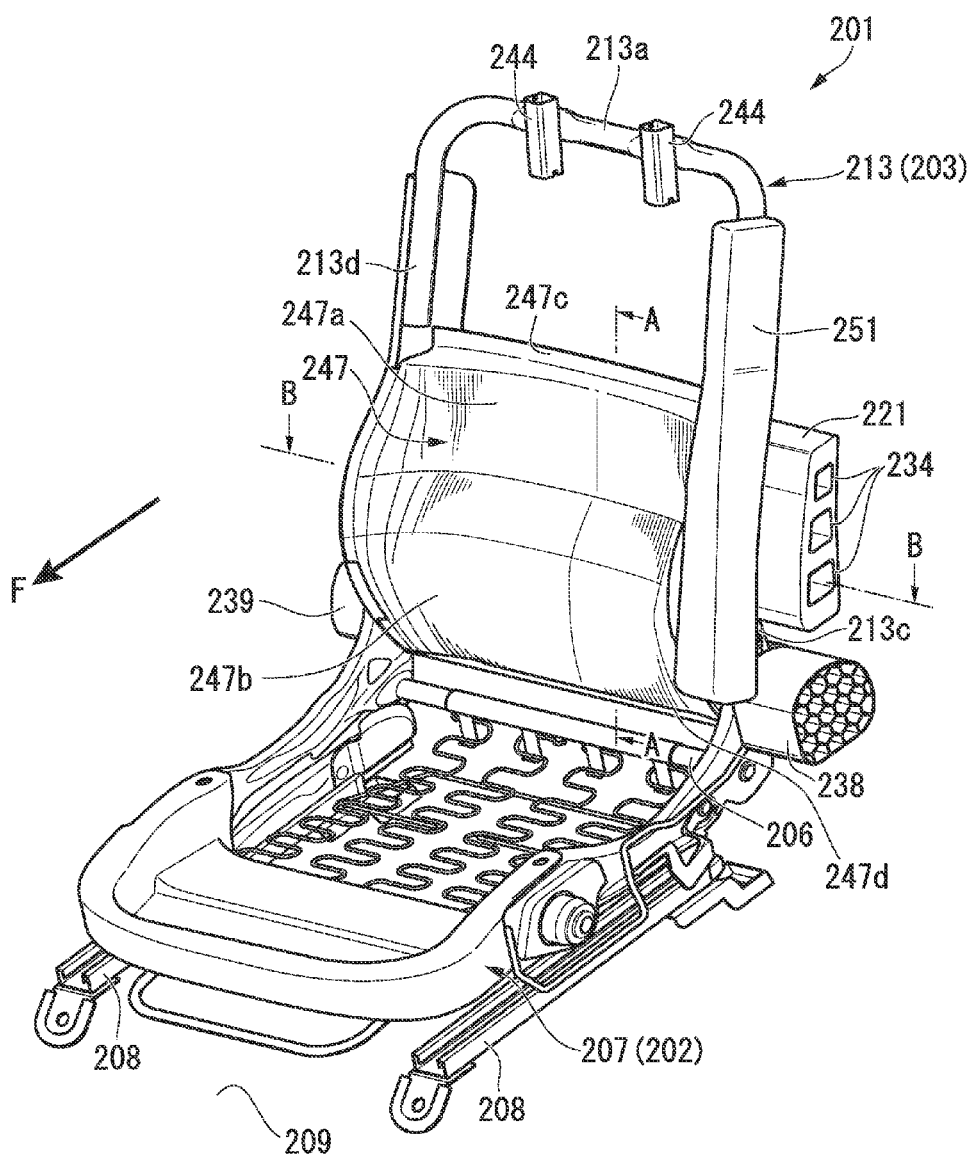
FIG. 15 is a perspective view seen obliquely upward from the front side a skeleton of a vehicle seat according to the third embodiment of the present invention.

FIG. 14 is a perspective view seen obliquely upward from the front side the vehicle seat 201 mounted in the front seat side of the vehicle, and FIG. 15 is a perspective view seen obliquely upward from the front side of a skeleton of the vehicle seat 201.

The vehicle seat 201 includes a seat cushion 202 that supports the hip of the occupant, a seat back 203 that is connected to the rear end part of the seat cushion 202, and mainly supports the waist and the chest (rear part) of the occupant, and a headrest (not shown) that is supported by an upper part of the seat back 203 and that supports the head and the neck of the occupant.

As shown in FIG. 15, the seat cushion 202 includes a cushion frame 207 in which a rear cross member 206 extended in the vehicle width direction is attached to the rear end side. The cushion frame 207 is attached to a vehicle body floor 209 through seat rails 208 and 208 so as to slide forward and backward.

Figure 16:
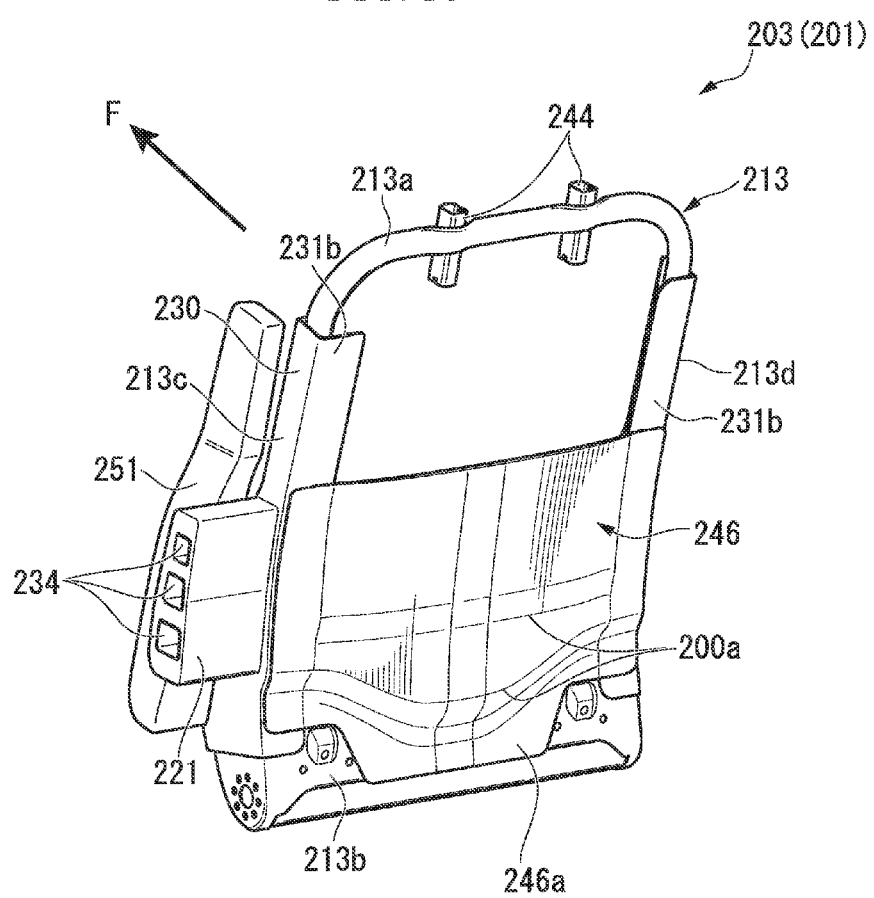
FIG. 16 is a perspective view seen obliquely upward from the rear side a seat back frame according to the third embodiment of the present invention.
Figure 17:
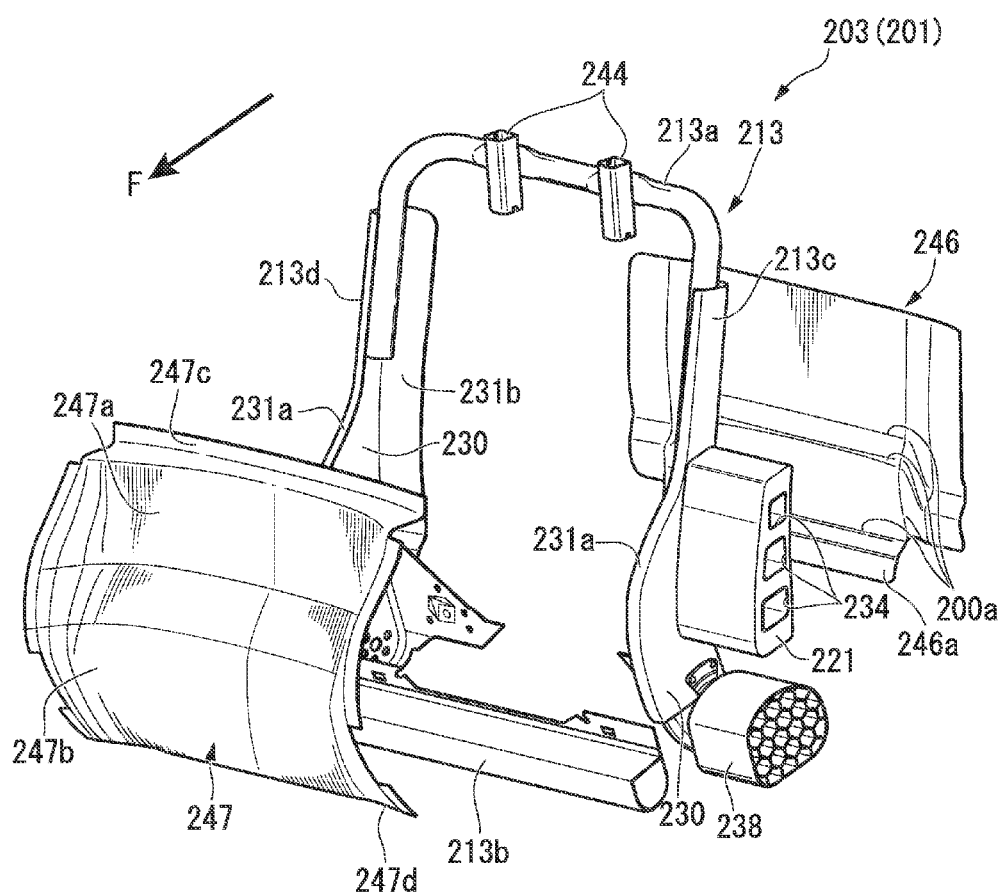
FIG. 17 is an exploded perspective view seen obliquely upward from the front side a set back frame according to the third embodiment of the present invention.
Figure 18:
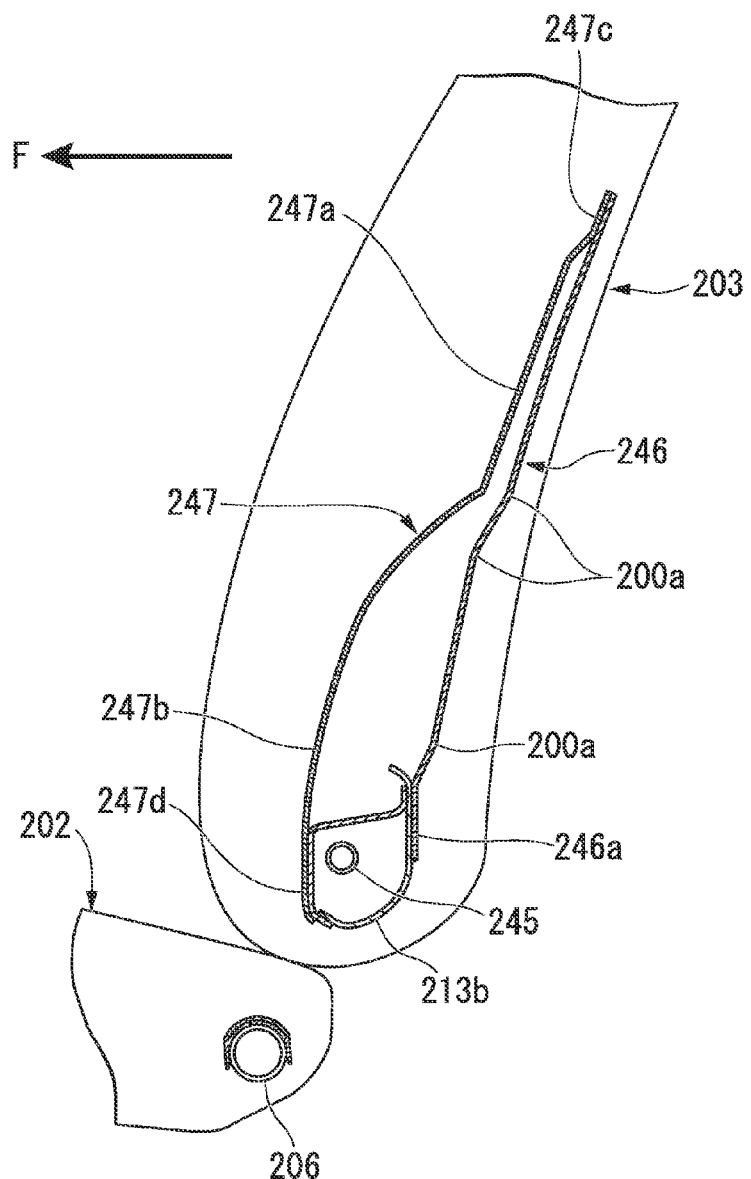
FIG. 18 is a cross-sectional view taken along an A-A line of FIG. 15.
Figure 19:
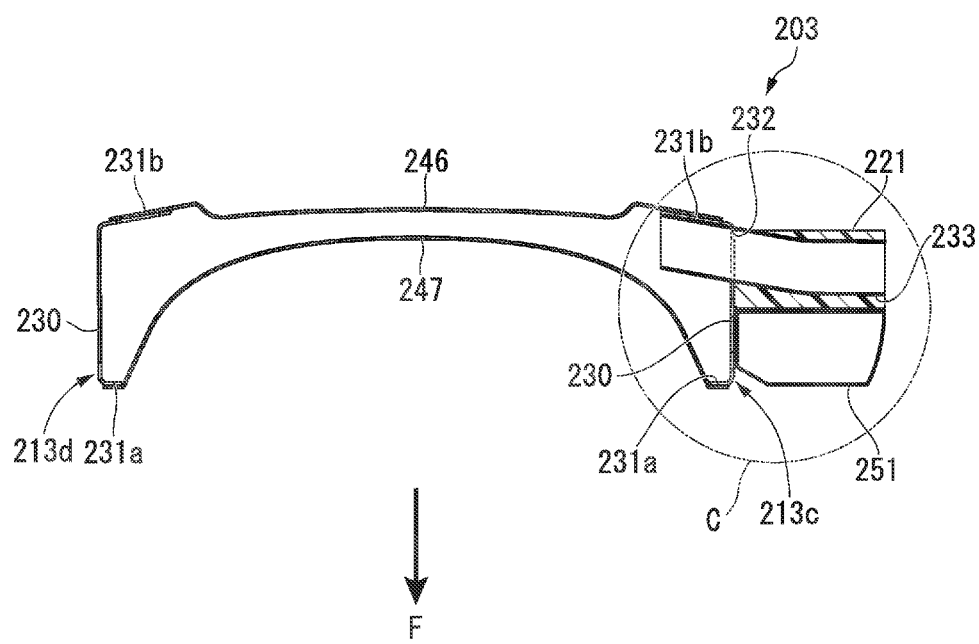
FIG. 19 is a cross-sectional view taken along a B-B line of FIG. 15.

FIG. 16 is a perspective view seen obliquely upward from the rear side of a skeleton of the seat back 203, FIG. 17 is an exploded perspective view seen obliquely upward from the front side of the skeleton, FIGS. 18 and 19 are cross-sectional views of the skeleton of the seat back 203.

As shown in FIGS. 15 to 19, the seat back 203 includes a seat back frame 213, and the lower end of the seat back frame 213 is coupled to the rear end part of the cushion frame 207 so as to incline. The seat back frame 213 includes an upper frame 213*a*, left and right side frames 213*c* and 213*d*, and a lower frame 213*b*.

The upper frame 213*a* is made of a substantially U-shaped pipe member. To the center of the upper side part that is extended in the seat width direction of the upper frame 213*a*, a pair of support pipes 244, which enable the headrest to move up and down and support the headrest, are attached.

The left and right side frames 213*c* and 213*d* are made of a panel member the cross-section of which in the horizontal direction is a substantially U-shape. The side frames 213*c* and 213*d* are formed such that the front and rear widths of an upper region from a substantially center part in the vertical direction are narrower than the front and rear widths of a region below the substantially center part. The upper region of the side frames 213*c* and 213*d* having the narrower front and rear widths are welded and fixed on a corresponding side part of the upper frame 213*a* so as to enclose the upper region thereof from the outer side in the seat width direction at the U-shaped cross-section part. In addition, to the lower end sides of the side frames 213*c* and 213*d*, a hinge (not shown) that is connected to the rear end of the cushion frame 207 and a recliner mechanism (not shown) that adjusts a tilt angle of the seat back frame 213 are attached. Further, as shown in FIG. 18, left and right recliner mechanisms are linked so as to interlock with each other by an operating rod 245 that extends in the seat width direction.

The lower frame 213*b* is formed in substantially in a cylindrical shape as a whole in such a manner that two curved plate members are bonded to each other, and extended in the seat width direction so as to surround the periphery of the operating rod 245. Both ends of the lower frame 213*b* are connected to both ends of the left and right side frames 213*c* and 213*d*.

The left and right side frames 213*c* and 213*d* are respectively connected to a front wall 231*a* and a rear wall 231*b* that are curved to the inner side in the seat width direction in the front and rear of a side wall 230 facing the outer side in the seat width direction. As described above, the side wall 230 of the side frames 213*c* and 213*d* is formed such that the width of the upper part from the substantially center part is narrower, and the width of the lower part is wider. Specifically, the rear end side of the side wall 230 is formed approximately straight in the upper and lower regions. The front end side of the side wall 230 is formed approximately straight from the upper part to the middle region in the vertical direction. The front end side of the side wall 230 is curved so as to gently bulge forward from its center area toward the lower side. Accordingly, in a lower edge area of the front wall 231a of the side frames 213a and 213d, a curved surface that bulges forward to conform to the curved shape of the front end side of the side wall 230 is provided.

In the rear part between the side frames 213c and 213d, a corrugated-shaped back plate 246 (a reinforcement plate) in which a plurality of ridge line parts 200a runs in the seat width direction is disposed. A side edge part of both sides of the back plate 246 is welded and fixed on a rear surface of the rear wall 231b of the side frames 213c and 213d. The back plate 246 is disposed so as to surround a range from the lower end of the side frames 213c and 213d to an approximately middle height in the vertical direction. In the lower end of the back plate 246, a lower joining piece 246a that is welded and fixed on the rear surface of the lower frame 213b is provided.

In addition, in the front side between the side frames 213c and 213d, a back pan 247 made of the plate member that is curved in a three-dimensional manner is disposed. A side edge part of both sides of the back pan 247 is welded and fixed on the front surface of the front wall 231a of the side frames 213c and 213d. As shown in FIG. 18, a substantially center region in the vertical direction of the back pan 247 is curved toward the rear side so as to straddle between the left and right side frames 213c and 213d. An upper edge part 247a side of the back pan 247 is extended upward by a predetermined length to be approximately parallel to the back pan 247, and then welded and fixed on an upper front surface of the back pan 247 by an upper joining piece 247c of the upper end. In addition, in the lower end of the back pan 247, a lower joining piece 247d that is welded and fixed on the front surface of the lower frame 213 is provided.

In the back pan 247 and the back plate 246, side edge parts of both sides are respectively welded and fixed on the front wall 231a and the rear wall 231b of the side frames 213c and 213d of both sides in a superimposing state. The upper edge parts are directly welded and fixed to each other. The lower edge parts are fixed through the lower frame 213b. Accordingly, the back pan 247 and the back plate 246 configure a closed cross-section together with the lower frame 213b. The closed cross-section is extended in the seat width direction so as to connect the interval of the side frames 213c and 213d.

As shown in FIG. 18, a part (hereinafter, referred to as "substantially the lower half part 247b") from the substantial center in the vertical direction of the back pan 247 to a lower region is formed into a curved cross-sectional shape in which the cross-section in the substantially vertical direction bulges forward toward the lower side. The curved shape of the substantially the lower half part 247b of the back pan 247 bulges gently forward toward a lower end from an upper end of a lumbar vertebra of the occupant, and the bulging height is continuous up to about the lower end.

As shown in FIG. 19, the back pan 247 is formed such that the cross-section in the substantially horizontal direction is concave-curved, so that the center in the seat width direction is sunk to the rear side of the vehicle body. The concavely-curved cross-sectional shape is provided over substantially the entire region in the vertical direction of the back pan 247. In particular, in the upper region of the substantially the lower half part 247b, an indent depth of the curved cross-section is most deeply formed. Therefore, the waist and the hip of the occupant seated on the seat are supported by the curved shape in the horizontal direction of the back pan 247 so that a region from the side part to the back part is enclosed.

Figure 20:
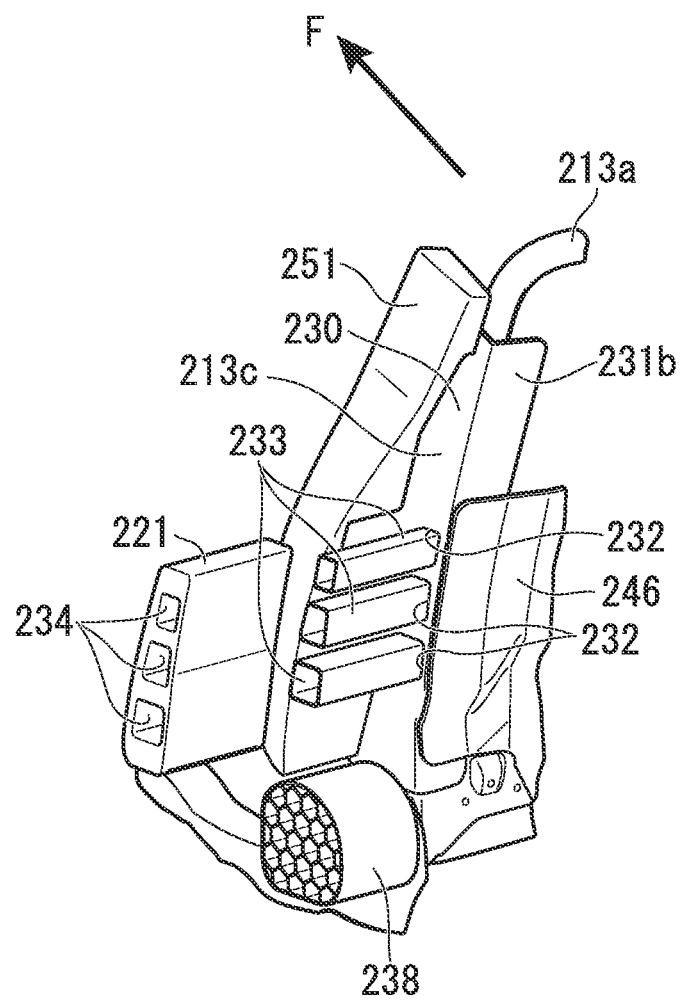
FIG. 20 is an exploded perspective view seen obliquely upward from the rear side a part of a seat back frame according to the third embodiment of the present invention.
Figure 21:
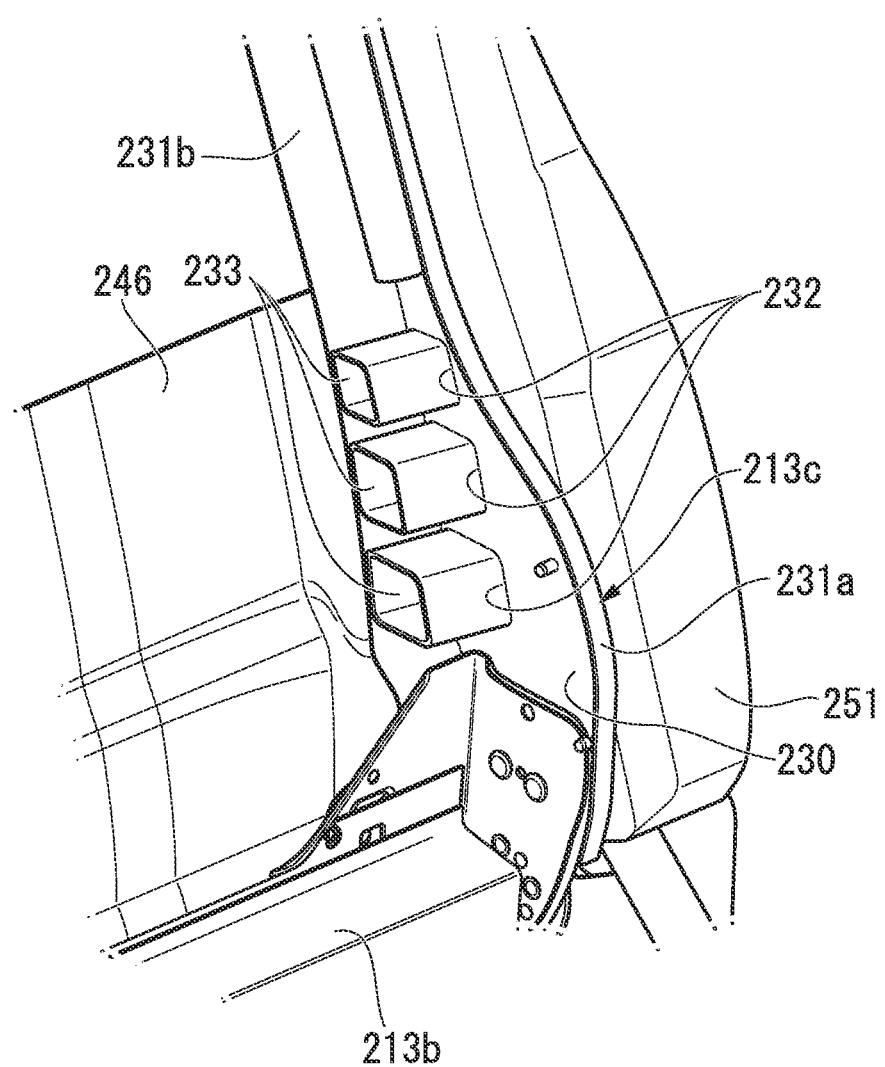
FIG. 21 is an exploded perspective view seen obliquely upward above from the front side a part of a seat back frame according to the third embodiment of the present invention.

FIGS. 20 and 21 are views showing an assembly state of components with respect to the side frame 213c on the outer side in the vehicle width direction. FIG. 20 is an exploded perspective view seen from the rear side of the side frame 213c on the outer side in the vehicle width direction. FIG. 21 is a perspective view in which the front side of the side frame 213c is seen on the inner side in the vehicle width direction in a state in which the back pan 247 is removed. In addition, FIG. 22 is an expanded cross-sectional view of the vehicle seat 201 corresponding to "C" of FIG. 19.

In the side wall 230 of the side frame 213c, three through holes 232 having a substantially rectangular shape are provided side by side in the vertical direction. A rectangular cylinder shaped guide pipes 233 (pipe members) are fixed in a state of being fitted into these through holes 232. The three through holes 232 are provided in a region, which is deviated to the rear side of the vehicle body in respect with the substantial center in the vertical direction of the side wall 230. A base end part of each of the guide pipes 233 fitted into the through holes 232 are welded and fixed on the front surface of the rear wall 231b that is extended on the inner side in the vehicle width direction from the rear end of the side wall 230 of the side frame 213c. Specifically, the base end part of the guide pipe 233, a flat rear wall is superimposed in the front surface of the rear wall 231b of the side frame 213c. In this state, both are welded and fixed.

Figure 22:
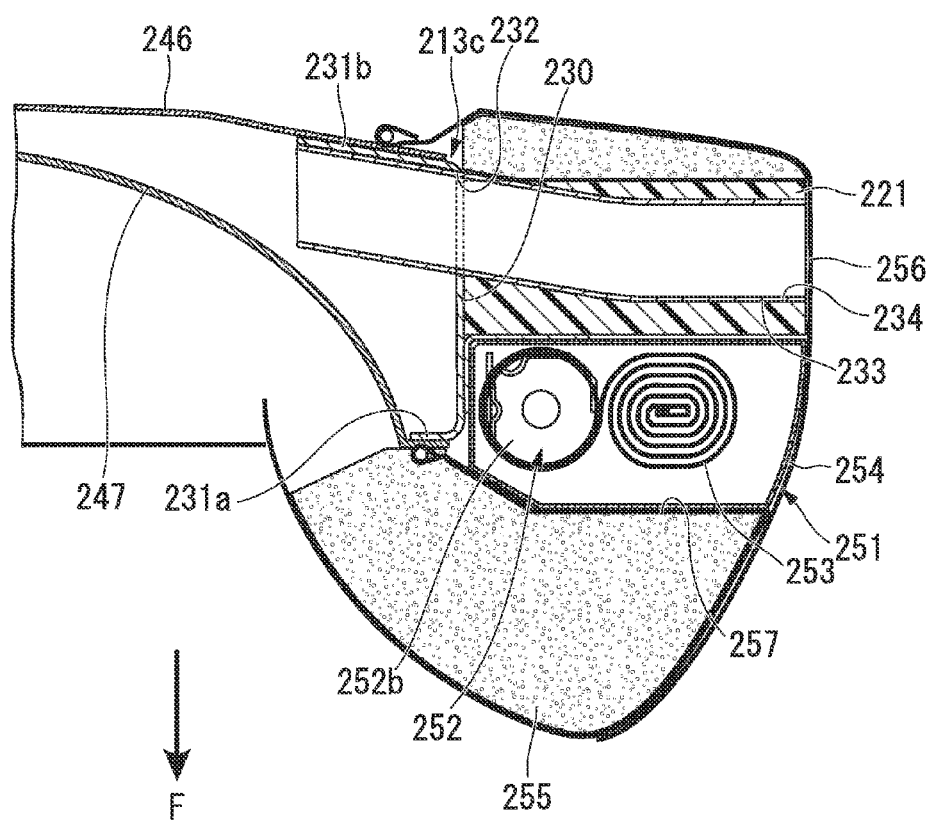
FIG. 22 is an expanded cross-sectional view of C of FIG. 19.

As shown in FIG. 22, the rear wall 231b of the side frame 213c is slightly inclined to the seat rear side. In each of the guide pipes 233, a part from the substantial center part in the longitudinal direction to the base end part is slightly inclined to the seat rear side so as to be along with the inclination of the rear wall 231b.

To the three guide pipes 233 protruded to the outer side in the vehicle width direction from the side wall 230, the load transmission block 221 is fixed in a state of being fitted thereto.

When an impact load is input from the side of the vehicle, the load transmission block 221 is a member that transmits the impact load from the side wall of the vehicle body to the side frame 213c. A plurality of cylindrical cross-sections that are extended in the vehicle width direction of the load transmission block 221 has honeycomb structures that are arranged in parallel. All of the load transmission blocks 221 are formed from a resin into a long rectangular shape in the vertical direction. In addition, the load transmission block 221 includes a plurality of fitting holes 234 into which the guide pipes 233 protruded to the side frame 213c are fitted. In a state in which these fitting holes 234 are fitted into the guide pipes 233, upper and lower end parts of a root part side of the load transmission block 221 are fastened and fixed to the side frame 213c by a bolt.

As shown in FIG. 22, in each of the fitting holes 234 of the load transmission block 221, a part from the center part in the longitudinal direction to the base end part side is slightly inclined toward the seat rear side so as to conform to a shape of the guide pipe 233.

Further, in the present embodiment, the guide pipes 233 and the load transmission block 221 form the load transmission member.

In addition, to the side wall 230 of the side frame 213c, a side air bag system 251 for protecting an occupant is attached.

As shown in FIG. 22, the side air bag system 251 includes an inflator 252 for sensing an impact to generate gas and a folded bag body 253 for receiving and deploying a gas pressure of the inflator 252. The side air bag system 251 is attached to the side frame 213c in a state of being received in a bag case 254 including a lid member capable of opening and closing.

The inflator 252 is attached to the side frame 213c along the longitudinal direction. The bag body 253 is disposed in the outer side in the seat width direction of a gas outlet 252b of the inflator 252, and disposed in a position facing the front surface of the load transmission block 221. The bag body 253 is wound and folded in a role type a plurality of times in the inflator 252 direction from a tip end side toward a root part side. Accordingly, when receiving gas pressure from the inflator 252, the bag body 253 is smoothly deployed toward the outer side in the vehicle width direction and the front side of the vehicle body while the winding is released from the root part side. In this instance, since the bag body 253 faces the front surface of the load transmission block 221, the deployment direction is restricted to a forward direction of the vehicle by the front surface of the load transmission block 221. In this state, the bag body 253 is deployed forward along a side wall (not shown) of the vehicle body such as a center pillar, a door lining, and the like.

Further, a reference numeral 255 of FIG. 22 is a pad member that is disposed in the peripheral area of the seat back frame 213, the load transmission block 221, and the side air bag system 251. A reference numeral 256 of FIG. 22 is a facing for covering an outer surface of the pad member 255.

In addition, as shown in FIG. 15, to the outer side (the outer side in the seat width direction) of the recliner mechanism (not shown) of the lower end of the side frames 213c and 213d of the left and right both sides, the load transmission blocks 238 and 239 are respectively attached. Similar to the upper transmission block 221, each of the load transmission blocks 238 and 239 has a honeycomb structure in which a plurality of cylindrical cross-sections extended in the vehicle width direction are disposed in parallel. In addition, the load transmission block 239 attached to the side frame 213d in the inner side in the vehicle width direction is opposed to a side surface of a console box (not shown) at the center in the vehicle width direction.

In the above described configuration, when receiving an impact load from the side of the vehicle, the side wall of the vehicle body such as a center pillar, and the like transforms in the seat back 203 direction, the side wall abuts on the load transmission blocks 221 and 238 in the side part of the vehicle seat 201, and the loads are input to these. When the load is input to the lower load transmission block 238, the lower load transmission block 239 on the inner side in the vehicle width direction abuts on the console box while the entire seat moves inward in the vehicle width direction. In this instance, the load is transmitted to a floor tunnel from the lower frame 213b of the seat back frame 213 through the load transmission block 239 and the console box.

In addition, when an impact load is input to the upper load transmission block 221, the load is transmitted, from right in the side, from the load transmission block 221 to the side frame 213c on the outer side in the width direction of the seat back frame 213. Further, the load is transmitted to the side frame 213d on the inner side in the width direction from the side frame 213c through a tubular structure by the back pan 247 and the back plate 246, and through the upper frame 213a and the lower frame 213b. The load transmitted to the side frame 213d is further transmitted to the floor tunnel through the load transmission block 239 and the console box.

However, the load input to the upper load transmission block 221 is directly transmitted to the side wall 230 of the side frame 213c, and at the same time, is transmitted to the rear wall 231b of the side frame 213c through a plurality of guide pipes 233 spaced to the vertical direction. The load is transmitted to one end of the back plate 246 joined to the rear wall 231b, and further transmitted to the rear wall 231b of the side frame 213d joined to the other end of the back plate 246.

Further, a surface of the back plate 246 is partitioned into a plurality of regions by the ridge line parts 200a extended in the seat width direction. Therefore, when a load is input to one end side in the seat width direction of the back plate 246, stress in a shear direction is generated in the plurality of partitioned regions. As a result, the input impact load is perceived over most regions of the back plate 246, and transmitted to the side frame 213d on the inner side so that the load is dispersed over the entire region of the back plate 246.

In addition, when the impact load is input from the rear of the vehicle, a front bulging part (a front bulging part of the cross-section in the substantially vertical direction) of the substantially the lower half part 247b of the back pan 247 first presses a part (a lower part from the lower end of the lumbar vertebrae) from the waist to the hip of the occupant seated on the seat from the rear surface side to the front side. Therefore, the lower side of the waist of the occupant is pressed forward. Accordingly, the chest, the head, and the neck of the occupant are pressed against the seat back 203 and the headrest. As a result, the head and the neck of the occupant approach the headrest at an early point in the initial state, and the neck of the occupant is protected.

As described above, in the seat back frame 213 of the vehicle seat 201, the base part of the guide pipe 233 is inserted into the through hole 232 formed in the side wall 230 of the side frame 213c on the outer side in the vehicle width direction. Further, the base part of the guide pipe 233 is welded and fixed on the front surface of the rear wall 231b of the side frame 213c, and at the same time the side edge part of the back plate 246 is welded and fixed on the rear surface of the rear wall 231b. Therefore, the load input from the load transmission block 221 to the guide pipe 233 may be almost linearly transmitted from the guide pipe 233 to the back plate 246 across the rear wall 231b of the side frame 213c. Accordingly, without generating unnecessary deformation moment to the side frame 213c at the time of the impact input, it is possible to rapidly transmit the impact to the side frame 213d on the inner side in the vehicle width direction. In particular, in the present embodiment, upper and lower parts of the back plate 246 are connected with the front back pan 247 to thereby configure a cylindrical shaped structure having a closed cross-section together with the back pan 247. Therefore, the impact load input from the guide pipe 233 to the back plate 246 may be transmitted to the side frame 213d on the inner side in the vehicle width direction while having a high strength.

In addition, in the seat back frame 213, since the base parts of the guide pipes 233 are coupled to each other across the rear wall 231b of the side frame 213c, a thickness in the front and rear directions of the seat back 203 is thinned, thereby reducing the size of the seat.

Further, as for the seat back frame 213, the plurality of guide pipes 233 are disposed in the side frame 213 to be spaced in the vertical direction, and the base part of each of the guide pipes 233 is welded on the rear wall 231b. Further, the load transmission block 221 from the outer side of the side wall 230 is fitted on the tip side of the guide pipes 233. Therefore, the input of the load having different heights and angles is received to the load transmission block 21 having a large capacity, and the load may be reliably transmitted to the rear wall 231b and the back plate 246 through the plurality of guide pipes 233 that are vertically spaced. Accordingly, even though variations in the height or the direction of the input load from the side wall of the vehicle body are present, the load may be always stably transmitted to the side frame 213d direction.

Further, the present invention is not limited only to the above-described embodiments, and various modifications are possible that are within the scope of the invention without departing from the spirit of the invention.

INDUSTRIAL APPLICABILITY

According to the embodiments of the present invention, there is provided the seat back frame for the vehicle seat which may control behaviors of an upper body of an occupant when the impact is input from the rear of the vehicle.

REFERENCE SIGNS LIST

1: vehicle seat
4: headrest
13: seat back frame
13c: side frame
13d: side frame
44: support pipe (headrest support)
47: back pan (supporting plate)
L: lumbar vertebra
101: vehicle seat
113: seat back frame
113b: lower frame (lower joining part)
113c: side frame
113d: side frame
146: back plate (rear plate)
146a: lower joining piece (lower joining part)
147: back pan (front plate)
147c: upper joining piece (upper joining part)
147d: lower joining piece (lower joining part)
201: vehicle seat
213: seat back frame
213c: side frame
213d: side frame
221: load transmission block (load transmission member, block member)
230: side wall
231b: rear wall
232: through hole
233: guide pipe (load transmission member, pipe member)
246: back plate (reinforcement plate)

The invention claimed is:

1. A seat back frame for a vehicle seat, comprising:
a pair of side frames that are disposed on both sides in a seat width direction;
a supporting plate that has both ends connected to a bottom section of each of the side frames;
a back plate that is formed behind the supporting plate, and connects back parts of each of the pair of side frames to each other;
an upper joining part that connects an upper part of the supporting plate and an upper part of the back plate;
a lower joining part that connects a lower part of the supporting plate and a lower part of the back plate; and
a load transmission member that is protruded from a side frame on an outer side in a vehicle width direction of the pair of the side frames to the outer side in the vehicle width direction;
wherein
the supporting plate is formed into a curved shape so that a vertical cross-section of the supporting plate bulges forward with respect to the back plate and so that a center part of the supporting plate curves toward a rear side of the vehicle seat in a horizontal cross-section,
the supporting plate and the back plate form a closed cross-section that extends in a seat width direction, both end parts of the back plate being connected to lower edges of the pair of side frames at a rear side of the supporting plate,
the side frame on the outer side in the vehicle width direction includes a side wall that has a through hole to which a base part side of the load transmission member is inserted, and
a rear wall extended on an inner side in the vehicle width direction from a rear end portion of the side wall is provided, and the base part of the load transmission member passing through the through hole of the side wall is joined to a front surface of the rear wall while a side edge part on the outer side in the vehicle width direction of the back plate is joined to a rear surface of the rear wall.

2. The seat back frame for the vehicle seat according to claim 1, wherein the supporting plate connects front parts of each of the side frames to each other.

3. The seat back frame for the vehicle seat according to claim 1, wherein a plurality of through holes of the side wall are separately arranged in a vertical direction, and the load transmission member includes a plurality of pipe members that are inserted to each of the through holes and joined to a front surface of a rear wall of the side frame, and a block member that covers the plurality of pipe members and is disposed on the outer side in the vehicle width direction of the side wall.

4. The seat back frame for the vehicle seat according to claim 1, wherein the supporting plate is disposed in a front side between the pair of side frames and the back plate is disposed in a rear side between the pair of side frames.

5. A seat back frame for a vehicle seat, comprising:
a pair of side frames that are disposed on both sides in a seat width direction;
a supporting plate that has both ends connected to a bottom section of each of the side frames;
a back plate that is formed behind the supporting plate, and connects back parts of each of the pair of side frames to each other;
an upper joining part that connects an upper part of the supporting plate and an upper part of the back plate;
a lower joining part that connects a lower part of the supporting plate and a lower part of the back plate; and
a load transmission member that is protruded from a side frame on an outer side in a vehicle width direction of the pair of the side frames to the outer side in the vehicle width direction;
wherein
the supporting plate is formed into a curved shape so that a vertical cross-section of the supporting plate bulges forward with respect to the back plate and so that a center part of the supporting plate curves toward a rear side of the vehicle seat in a horizontal cross-section,
the supporting plate and the back plate forms a closed cross-section that extends in a seat width direction, both end parts of the back plate being connected to lower edges of the pair of side frames at a rear side of the supporting plate,
the side frame on the outer side in the vehicle width direction includes a side wall that has a through hole to which a base part side of the load transmission member is inserted, a rear wall extended on an inner side in the vehicle width direction from a rear end portion of the side wall is provided, and the base part of the load transmission member passing through the through hole of the side wall is joined to a front surface of the rear wall, and a plurality of through holes of the side wall are separately arranged in a vertical direction, and the load transmission member includes a plurality of pipe members that are inserted to each of the through holes and joined to a front surface of a rear wall of the side frame, and a block member that covers the plurality of pipe members and is disposed on the outer side in the vehicle width direction of the side wall.

* * * * *